(12) United States Patent
Ryzhkov

(10) Patent No.: US 6,884,405 B2
(45) Date of Patent: Apr. 26, 2005

(54) METHOD AND DEVICE FOR PRODUCING HIGHER FULLERENES AND NANOTUBES

(75) Inventor: Vladislav Andreevitch Ryzhkov, Limassol (CY)

(73) Assignee: Rosseter Holdings Limited, Limassol (CY)

(*) Notice: Subject to any disclaimer, the term of this patent is extended or adjusted under 35 U.S.C. 154(b) by 44 days.

(21) Appl. No.: 09/961,528

(22) Filed: Sep. 24, 2001

(65) Prior Publication Data

US 2002/0122754 A1 Sep. 5, 2002

Related U.S. Application Data

(63) Continuation-in-part of application No. PCT/IB00/00406, filed on Mar. 20, 2000.

(30) Foreign Application Priority Data

Sep. 6, 2001 (GB) ............................................. 0121554
Sep. 6, 2001 (GB) ............................................. 0121558

(51) Int. Cl.[7] .................................................. D01F 9/12
(52) U.S. Cl. ........................... 423/447.1; 423/447.3; 204/164; 204/173; 977/DIG. 1
(58) Field of Search ................... 423/447.1, 447.3, 423/445 B, 445 R; 204/164, 173, 171, 172; 977/DIG. 1

(56) References Cited

U.S. PATENT DOCUMENTS

| | | | |
|---|---|---|---|
| 3,224,952 A | * 12/1965 | Vialaron | .................... 204/171 |
| 3,607,714 A | * 9/1971 | Vialaron | ................ 422/186.29 |
| 5,482,601 A | 1/1996 | Ohshima et al. | |
| 5,534,232 A | * 7/1996 | Denes et al. | ........... 422/186.26 |
| 5,641,466 A | 6/1997 | Ebbesen et al. | |
| 5,698,175 A | 12/1997 | Hiura et al. | |
| 5,753,088 A | 5/1998 | Olk | |
| 5,876,684 A | * 3/1999 | Withers et al. | ......... 423/445 B |
| 5,916,642 A | 6/1999 | Chang | |
| 6,063,243 A | * 5/2000 | Zettl et al. | ................... 204/164 |

FOREIGN PATENT DOCUMENTS

RU 97115694 7/1999

OTHER PUBLICATIONS

Saito et al. "Diameters of Single–Wall Carbon Nanotubes Depending on Helium Gas Pressure in an Arc Discharge" Feb. 26, 2000, Journal of Physical Chemistry B, vol 104, pp. 2495–2499.*

(Continued)

Primary Examiner—Stanley S. Silverman
Assistant Examiner—Peter J Lish
(74) Attorney, Agent, or Firm—Blackwell Sanders Peper Martin LLP

(57) ABSTRACT

A fullerene/nanotubes mixture is produced during a periodical pulsed auto-regulated action of the electric current arc-discharge in the multi-component hydrocarbon medium with limited fullerenes' solubility, besides, the action is continued until the medium dissolves $C_{60}$. Higher fullerenes absorbed by the ultra-thin graphite particles are separated from $C_{60}$ dissolved in the liquid medium by sedimentation, whereas the carbon nanotubes are separated from the ultra-thin graphite particles by treating with a boiling concentrated HN03 acid and by low speed centrifuging/acid mixture until the black sediment of the ultra-thin graphite particles is precipitated to the bottom. The periodically pulsed auto-regulated regime of the electric-current arc-discharge is performed by contact breaking an electric circuit due to lifting spherical contactors by gaseous products released during the action and by switching the circuit due to the contacts' going down under action of gravity.

28 Claims, 13 Drawing Sheets

Schematic diagram of Apparatus-1 for producing fullerenes and nanotube deposits

OTHER PUBLICATIONS

P.M. Ajayan, T.W. Ebbesen, T. Ichihashi, S. Iijimi, K. Tanigaki, H. Hiura; Opening Carbon Nanotubes with Oxygen and Implications for Filing; Nature, vol. 362, pp. 522–525, Apr. 8, 1993, USA.

Ryzhkov, V.A.; The XRF–Based Technique for Characterization of Carbon Nanotubes; Nuclear Physics Institute at TPU, Tomsk 634050, 1999 Russia. Website: http://www.ioffe.rssi.ru/SVA/IWFAC/abst1999/index.html.

Modak, D.K.; Mukherjee, S.; Chaudhuri, B.K.; Bhar, S.K.; De, R.L.; A Simple Technique for Producing Fullerenes from Electriclly Discharged Benzene and Toluene; Indian J. Phys. vol. 67A. (4) 2 pp. 307–310; 1993, India.

Smalley, R.E.; From Balls to Tubes to Ropes; New Materials from Carbon; American Institute of Chemical Engineers; South Texas Section; Jan. Meeting; Houston, Texas; USA; Jan. 4, 1996, USA.

Thess, Andreas; Lee, Roland; Nikolaev, Pavel; Dai, Hongiie; Petit, Pierre; Robert, Jerome; Xu Chunhui; Lee Hee Young; Kim Gon Seong; Rinzler, Andrew G.; Colbert, Daniel T.; Scuseria, Gustavo; Tomanek, David; Fischer, John E.; Smalley, Richard E.; Crystalline Ropes of Metallic Carbon Nanotubes; Science vol. 273, pp. 483–487 (Jul. 26, 1996).

Zhou, X.; Jianben, L; Zhaoxia, J.; Zhennan, G.; Yongqing, W.; Yiliang, S; Solubility of Fullerene $C_{60}$ and $C_{70}$ in Toluene, O–Xylene and Carbon Disulfide at Various Temperatures; Fullerene Science and Technology, vol. 5(1), pp. 285–290 (1997).

Shi, Z; Yongfu, L; Zihuang, Z; Zhennan, G; Yaogang, Z; Iijima, S.: Zhou, L; Yue, K.T.; Zhang, S.; Mass–Production of Single–Wall Carbon Nanotubes by ARC Discharge Method; Carbon, vol. 37; pp.1449–1453 (1999).

Sivaraman, N; Dhamodaran, R; Kaliappan, I; Srinivasan, T.G.; Vasudeva Rao, P.R.; Mathews, C.K; Solubility of C60 in Organic Solvents; American Chemical Society; J.Org.Chem, vol. 57, pp. 6077–6079; 1992, USA.

Diedrich, F.; Ettl, R.: Rubin, Y.; Whetten R.L.; Beck, R.; Alvarez, M.; Anz, Samir; Sensharma, D.; Wudl, F.; Khemani, K.; Koch, A.; The Higher Fullereness: Isolation and Characteriation of $C_{76}$, $C_{84}$, $C_{90}$, and $C_{70}O$, An Oxide of $D_{5h}$–$C_{70}$; Science, vol. 252; pp. 548–551; Apr. 26, 1991.

Ruoff, R.S.; Tse, D.S.; Malhotra, R.; Lorents, D.C.; Solubility of $C_{60}$ in a Variety of Solvents; American Chemical Society; J. Phys. Chem. vol. 97, pp. 3379–3383, Jan. 7, 1993, USA.

Ebbesen, T.W.; Ajayan, P.M.; Large–Scale Synthesis of Carbon Nanotubes; Nature, vol. 358, pp. 220–223; Jul. 16, 1992, USA.

Kratschmer, W.; Lamb, L. D.; Fostiropoulos, K; Huffman, D.R.; Solid $C_{60}$: A New Form of Carbon; Nature, vol. 347, pp. 354–359; Sep. 27, 1990, USA.

Khemani, K.C.; Prato, M; Wudl, F.; A Simple Soxhlet Chromatographic Method for the Isolation of Pure $C_{60}$ and $C_{70}$; American Chemical Society; J. Org. Chem. vol. 57, pp. 3254–3257, 1992, USA.

Guo, T.; Nikolaev, P.; Thess, A.; Colbert, D.T.; Smalley, R.E.; Catalytic Growth of Single–Walled Nanotubes by Laser Vaporization; Chemical Physics Letters, vol. 243, pp. 49–54; Sep. 8, 1995.

* cited by examiner

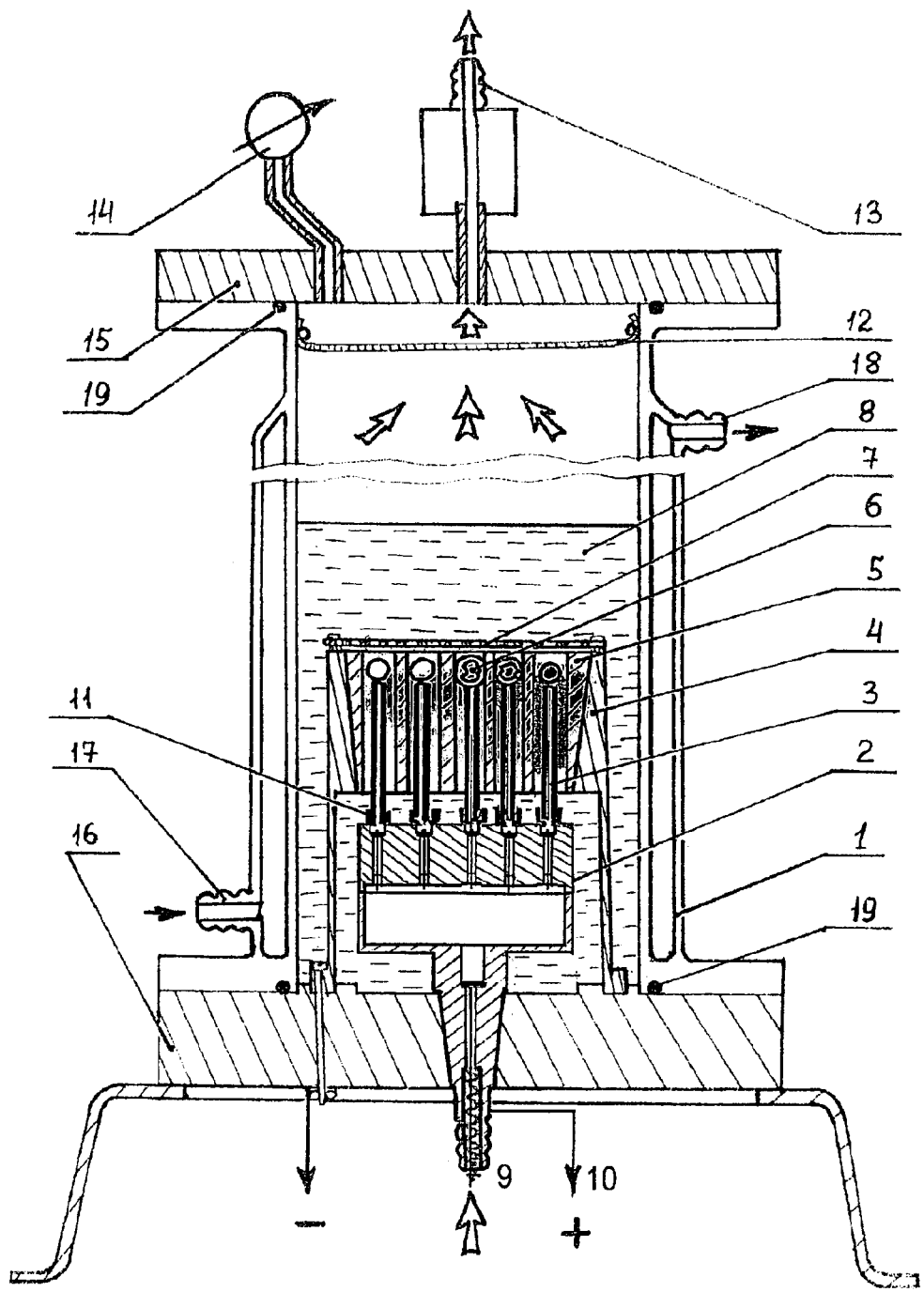
FIG.1 Schematic diagram of Apparatus-1 for producing fullerenes and nanotube deposits

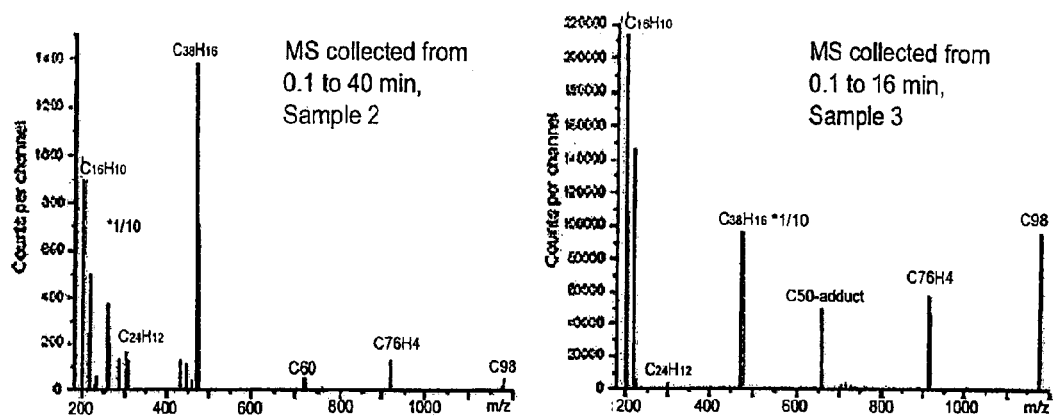
FIG.3 TOF ESI-Mass Spectra of the eleuents after filtration through Molecular Sieves 8/10 Angstroms
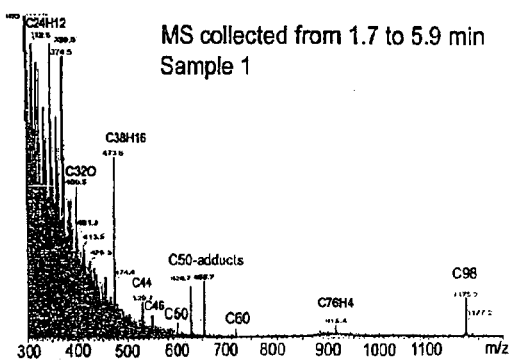
FIG.2. TOF ESI-MS before filtration through Sieves
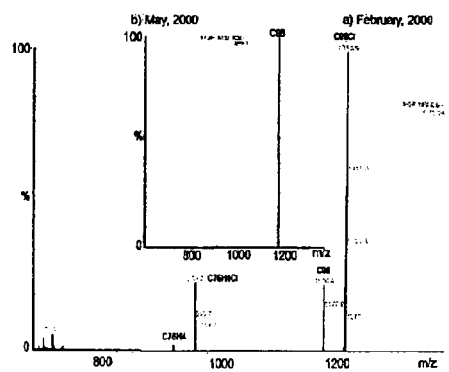
FIG.4 TOF ESI-MS during storage of sample 3

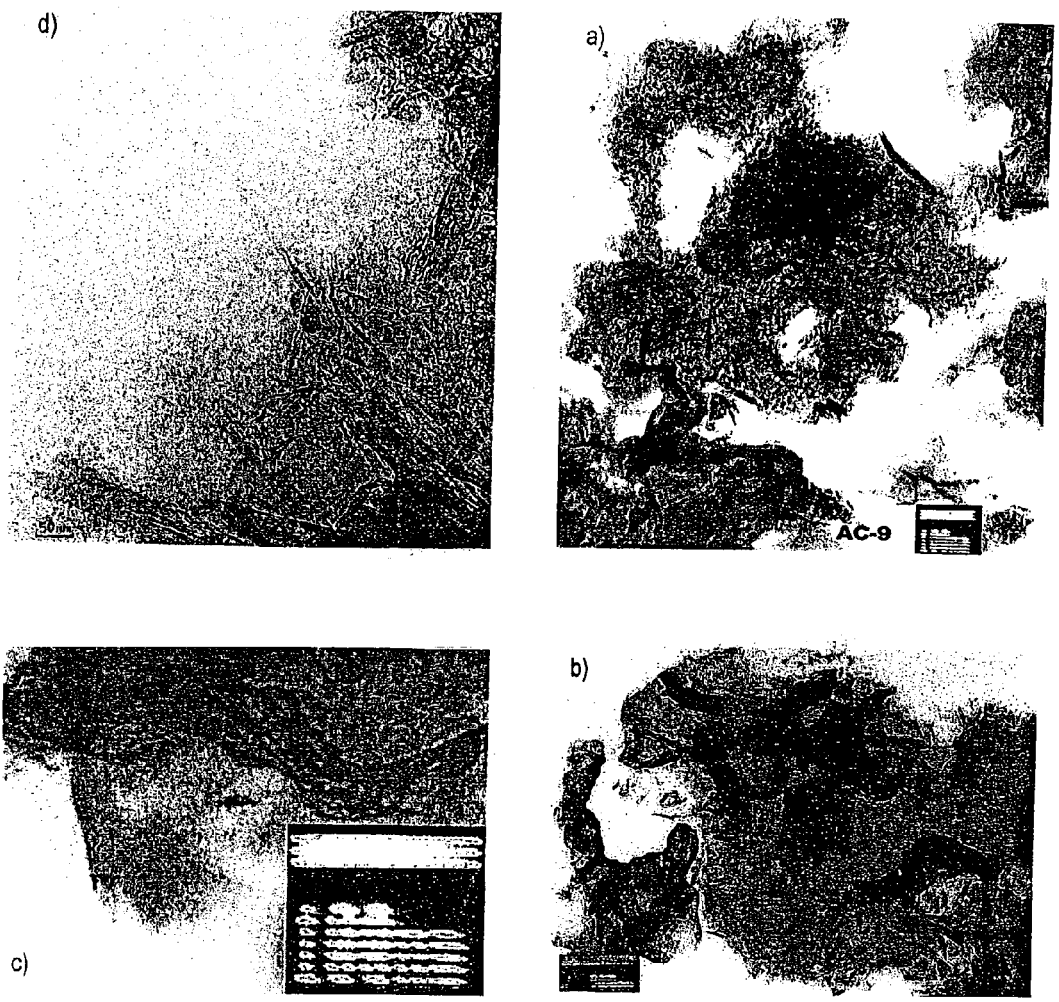
FIG.5 TEM images of deposits produced using AC (53Volts) arc in Apparatus-1:
   a - 3-phase current, benzene/acetone=1:1;   b - 1-phase current, toluene
   c - bundle of tangled SWNTs, 3-phase current, toluene/Co/Ni-naphtenates
   d - 3-phase current rectified with diodes (pulsed positive modes), benzene

FIG.8 TEM image of deposits produced with Apparatus-1 (DC) in cyclohexane
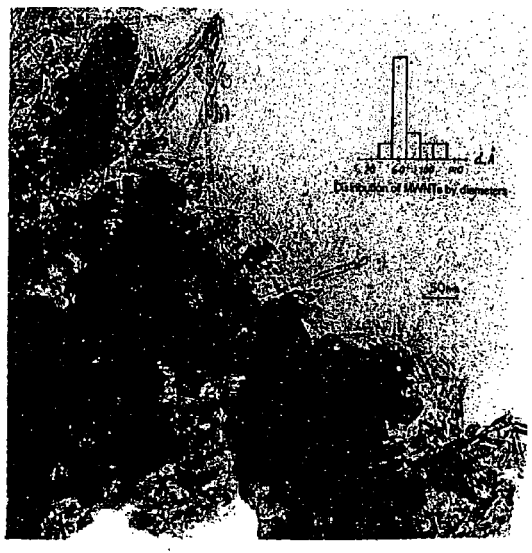
FIG.7 TEM image of deposits produced with Apparatus-1 (DC) in benzene
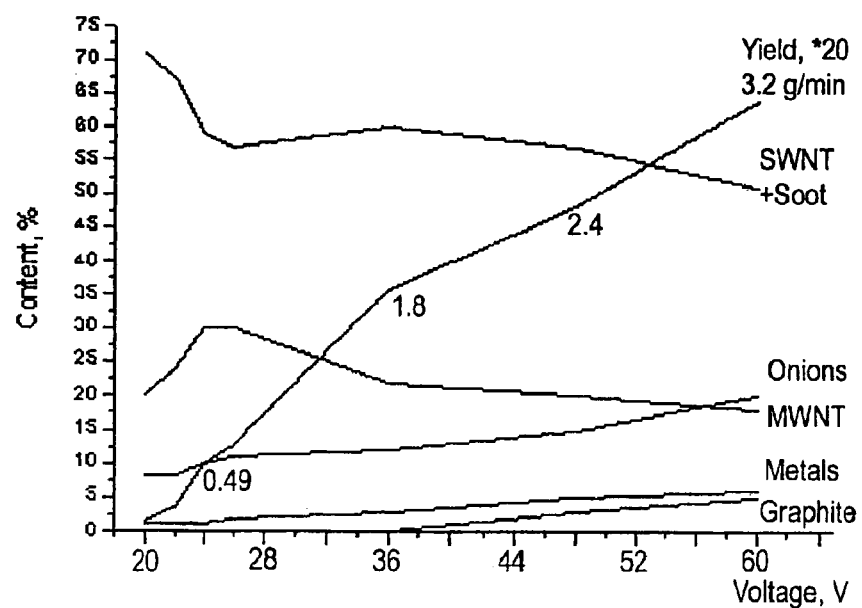
FIG.6 Composition and Yield of deposits vs DC voltage in Apparatus-1

Scheme of the device for producing higher fullerenes and carbon nanotubes

Composition and Yield of deposits vs DC voltage in Apparatus-2

Micro-Raman spectra of SWNTs in deposits as produced

XRD profiles of MWNTs/onions in deposits as produced

FIG. 18b
FIG. 18c
a) 100 nm
TEM images of purified MWNTs/SWNTs (a,b) and MWNTs opened from spherical ends (c)
FIG. 18a
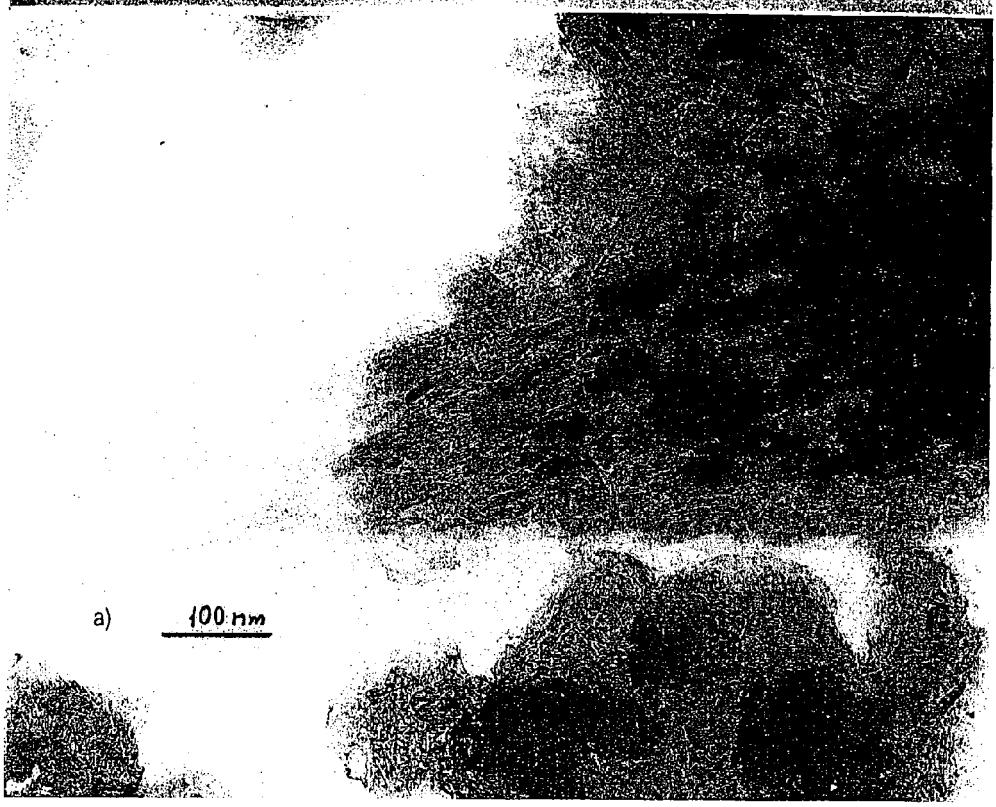

Typical TEM image of deposits produced over Mo anodes at 60 Volts in toluene

METHOD AND DEVICE FOR PRODUCING HIGHER FULLERENES AND NANOTUBES

APPLICATION CROSS-REFERENCES

This application is a continuation-in-part of PCT Application No. PCT/IB00/00406, filed 20 Mar. 2000, and which named the United States as a designated country. This application also claims priority of PCT Application No. PCT/IB99/00481, filed 23 Mar. 1999; Great Britain Application No. 0121554.0, filed 6 Sep. 2001; and Great Britain Application No. 0121558.1, filed 6 Sep. 2001.

FIELD OF THE INVENTION

The invention is related to chemical technologies, particularly to the field for the production of fullerenes and carbon nanotubes.

BACKGROUND OF THE INVENTION

Fullerenes and nanotubes are the most desirable materials for basic research in both chemistry and physics, as well as research in electronics, non-linear optics, chemical technologies, medicine, and others.

The processes of producing new allotrope forms of carbon, fullerenes, nanotubes and nanoparticles (buckyonions) are based on the generation of a cool plasma of carbon clusters by an ablation of carbon-containing substances, driven by lasers, ion or electron beams, a pyrolysis of hydrocarbons, an electric arc discharge, resistive or inductive heating, etc., and clusters' crystallization to the allotropes under certain conditions of annealing (R. E. Smalley, *From Balls to Tubes to Ropes: New Materials from Carbon*, in Proc. of American Institute of Chemical Engineers, South Texas Section, January Meeting in Houston, Jan. 4, 1996), after which fullerenes are usually eluted from the soot by the use of aromatic solvents, such as benzene, toluene, xylenes, chlorobenzene, 1,2-dichlorobenzene, and the like (P. M. Ajayan et al., *Nature*, 1993, v.362, p.522). Nanotubes on the other hand are separated from soot and buckyonions by the use of gaseous (air, oxygen, carbon oxides, water steam, etc.) (Ebessen et al., U.S. Pat. No. 5,641,466, Issued Jun. 24, 1997, *Method of Purifying Carbon Nanotubes*) or liquid oxidants (nitric, hydrochloric, sulfuric and other acids or their mixtures) (Andreas Thess et al., *Science*, 273, 483–487, Jul. 26, 1996).

The processes of forming different carbon allotropes (for instance, fullerenes and nanotubes/buckyonions) are competitive and, therefore, it is possible to displace the balance in their output by changing conditions either of the generation process or of crystallization (annealing). In arc discharge processes, increasing the pressure of a buffer gas (He or Ar) from 50–150 Torr, which is optimal for producing fullerenes, to 500 Torr leads to a preferential formation of Multi-Wall Nano Tubes (MWNT)/onions (K. S. Khemani et al., *J. Org. Chem.*, 1992, v.57, p.3254). Addition of some metal catalyzers (Co, Ni, Pt, Fe, etc.) to the initial graphite donor leads to preferential formation of Single-Wall Nano-Tubes (SWNT) (W. Kraechmer et al., *Nature*, 1990, v.347, p.354) with a yield up to 70% in case of a laser ablation of said graphite.

Several methods are used for producing SWNTs (Andreas Thess et al., *Science*, 273, 483–487, Jul, 26, 1996), each of which differs in the generation of the cool carbon clusters' plasma. Comparatively low outputs of SWNTs lead to very high prices of the SWNTs ($1,000–10,000 per gram).

The process of producing higher fullerenes (the fullerenes higher than C70) is developed to a less extent that the process for the classical production of C60 and C70.

The main problem is a very low yield of the higher fullerenes which for C74, C76, C78, and C84 is usually about 1–3% and less than 0.1% for C90, C94, C98 in comparison to the 10–40% for the classical fullerenes (K. S. Khemani et al., *J. Org. Chem.*, 1992, v.57, p.3254). As a result, the amounts of C90 and higher available are not enough to study their general properties.

Thus, a method and device are required for producing higher fullerenes and carbon nanotubes with an attainable result (greater amounts of higher fullerenes and nanotubes at a relative low cost), that is expressed as preferably producing the higher fullerene and in a simple separation of the nanotubes from the soot particles.

The existing method and device for producing fullerenes (W. Kraechmer et al., *Nature*, 1990, v.347, p.354) suggests the following. That graphite electrodes should be placed in a contained volume filled by He gas at a pressure of 50–150 Torr. Under certain conditions (electric arc's current is up to 200 A and voltage in the range 5–20 V) evaporated graphite clusters can form fullerene molecules, mainly C60 (80–90%) and C70 (~10–15%) as well as small amounts of higher fullerenes (total sum is not exceeding 3–4%). High Performance Liquid Chromatography (HPLC) is required to separate individual fullerenes (F. Diederich et al., *Science*, 1991, v.252, p.548).

HPLC is characterized by a very low production of higher fullerenes and as a result market prices of the higher fullerenes are enormous, more than $1,000–£10,000 per gram (Alderich catalog, 1999). Therefore this method and device is useless for producing higher fullerenes. Outputs of C76, 78, 84 for such technology is about a couple of milligrams a day per processor, even less for higher fullerines.

The use of both relatively low arc currents and special metallic catalysts are needed for producing single-walled carbon nanotubes with certain diameters. The maximal nanotube output achieved is 60% of the graphite material scraped from a cathode surface. The total nanotube output is greatly decreased during the separation of the nanotubes from the rest of the soot particles when an oxidation process with gases (oxygen, carbon dioxide) is usually used. Moreover, the separation process is rather long and complicated.

It is therefore necessary to find an approach which allows production of higher fullerenes and nanotubes with higher yields.

For the C74 fullerene such a way has been realized (F. Diederich et al., *Science*, 1991, v.252, p.548) by the use of a constant current arc-discharge in a liquid benzene and/or toluene medium, which dissolves fullerenes well. The dominant fullerene molecules were C50, whereas the concentration of C60 and C74 was comparable but 3–8 times less than that of C50. All fullerenes produced were dissolved in the medium and, after removal of non-dissolved soot particles (either by centrifugation or filtration) fullerenes could be separated by HPLC.

However, no fullerenes greater than C74 or SWNTs were produced this way. The greatest problem of all the methods is the use of an electric arc discharge that provides a gap of constant value between the graphite rods. In observing Modak's method (D. K. Modak et al., *Indian J. Phys.*, 1993, v.A67, p.307) a safety problem arose because of the release of huge amounts of gases (mainly, hydrogen and acetylene) in the process of cracking benzene/toluene.

The basic method for producing MWNT/buckyonions (K. S. Khemani et al., *J. Org. Chem.*, 1992, v.57, p.3254) using a DC arc discharge of 18V voltage between a 6 mm diameter graphite rod (anode) and a 9 mm diameter graphite rod (cathode) which are coaxially disposed in a reaction vessel maintained in an inert (helium at pressure up to 500–700 Torr) gas atmosphere has a problem because it is not possible to continuously produce carbon nanotube/buckyonion deposit in a large amount because the deposit is accumulated on the cathode as the anode is consumed. It is required to maintain a proper distance (gap) between the electrodes.

Oshima et al. (U.S. Pat. No. 5,482,601, Issued Jan. 9, 1996, *Method and Device for the Production of Carbon Nanotubes*) suggest a complicated mechanism for maintaining the gap (preferably in the range from 0.5 to 2 mm) between the electrodes at the same DC voltage (preferably 18–21 V)/current (100–200 Amp) and for scraping the cathode deposit during the process. As a result, they are able to produce up to 1 gram of a carbonaceous deposit per hour per one apparatus (pair of electrodes). A nanotube/buckyonion composition of the deposit is supposed to be the same as in (T. Ebessen et al., *Nature*, 358, 220, 1992, or T. Guo et al., *Chem Phys. Lett.*, 1995, v.243, p.49), i.e., nanotube: carbon nanoparticles (buckyonions) 2:1. A specific consumption of electric energy is about 2–3 kW·hour per one gram of the deposit. Complexity of the device, high specific energy consumption plus consumption of the expensive inert gas, helium, are the most factors that restrain bulk production of MWNT/buckyonion deposits by this method.

Instead of these methods, to produce nanotubes in bulk Olk (U.S. Pat. No. 5,753,088, Issued May 19, 1998, *Method for Making Carbon Nanotubes*) suggests simplifying a DC arc discharge device by immersing carbonaceous electrodes in a liquefied gas ($N_2$, $H_2$, He, Ar or the like). The other arc parameters are nearly the same (1 8V-voltage, 80 Amps-current, 1 mm-gap, 4–6 mm in diameters-electrodes). However, such a "simplification" leads even to poorer results than those in the methods mentioned above. It was possible to maintain an arc between the electrodes just for 10 seconds, therefore, the production was very low. A composition of the deposit was nearly the same as in the previous ones.

To improve properties of the said deposits they suggest purifying and uncapping MWNTs (Ebessen et al., U.S. Pat. No. 5,641,466, Issued Jun. 24, 1997, *Method of Purifying Carbon Nanotubes*; Andreas Thess et al., *Science*, 273, 483–487, Jul. 26, 1996) by using gaseous/liquid oxidants and filling the uncapped nanotubes with different materials (metals, semiconductors, etc.) to produce nanowires/nanodevices. Tips of nanotubes are more reactive than side walls of buckyonions. As a result, oxidation only carbon nanotubes are finally left while buckyonions disappear.

Recently, it has been discovered that buckyonions are very promising material to produce diamonds. However, known processes produce less buckyonions than nanotubes and purifying of deposit by using known methods leads to a complete reduction of buckyonions. Therefore, it is required to find an improved process for producing or purifying buckyonions.

It is required to uncap nanotubes to fill them with metals (to produce nanowires) or other substances, like hydrogen (to create a fuel cell).

The main problem for uncapping the tubes by known methods is supposed to be that under the oxidation the tube ends become filled with carbonaceous/metallic debris that complicates filling the open-ended tubes with other materials after oxidation, finally reducing an output of the filled nanotubes.

Chang (U.S. Pat. No. 5,916,642, Issued Jun. 29, 1999, *Method of Encapsulating a Material in a Carbon Nanotube*) suggests a method of encapsulating a material in a carbon nanotube in-situ by using a hydrogen DC arc discharge between graphite anode filled with the material and graphite cathode. The main difference from the above mentioned inventions is the use of hydrogen atmosphere to provide conditions for encapsulating the material inside nanotubes during the arc-discharge, i.e., in-situ. All the arc discharge parameters are nearly the same as in the above mentioned inventions (20V-voltage, 100 Amp-current, 150 $A/cm^2$-current density, 0.25–2 mm-gap, 100–500 Torr-pressure of the gas). The presence of hydrogen is thought to serve to terminate the dangling carbon bonds of the sub-micron graphite sheets, allowing them to wrap the filling materials. Judging by TEM examination of the samples produced by this method, about 20–30% of nanotubes with diameters of approximately 10 nm are filled with copper. The range of germanium filled nanotubes is 10–50 nm and their output is much lower than that of the copper filled nanotubes. A use of helium atmosphere (at the same pressure in the range of 100–500 Torr) instead of hydrogen leads to a preferable formation of fullerenes, cooper or germanium nanoparticles and amorphous carbon (soot particles) with no nanotubes at all. A mixture of hydrogen and an inert (He) gas may be used for the encapsulation as well.

Shi et al. (Z. Shi et al., *Mass Production of SWNT by Arc Discharge Method*, Carbon, v.37, n.9, pp.1449–1453, 1999) have reported a mass production of SWNTs by a DC arc discharge method with a Y—Ni alloy composite graphite rod as anode. A cloth-like soot is produced, containing about 40% SWNTs with diameter about 1.3 nm. The most important feature of this invention is the addition of Y—Ni alloy in the anode. However, the yield of the deposits and specific energy consumption are nearly the same as in the inventions described above. Other References include Hiura et al., U.S. Pat. No. 5,698,175, issued Dec. 16, 1997, *Process for Purifying, Uncapping and Chemically Modifying Carbon Nanotubes*; R. O. Loutfy, rloutfy@mercorp.com; N. Sivarman et al., *J. Org. Chem.*, 1992, v.57, p.6007; M. T. Beck, G. Mandi, *Fullerene Sci. Technol.*, 1996, v.3, p.32; X. Zhou et al., *Fullerene Sci. Technol.*, 1997, v.5(1), p.285; V. A. Ryzhkov, in *Abstracts of Intern. Workshop on Fullerenes and Allotropes of Carbon*, IWFAC '99, 3–8 Oct. 1999, St. Petersburg, Russia; A. P. Il'in, Yu. A. Kracnyatov, G. A. Volostnov, Y. T. Galeev, ICI C01 B31/00, *The Device and Method for Producing Fullerenes—Application to a Russian Patent* (Tomsk High Voltage Institute, Priority from September 1997); and R. S. Ruoff et al., *J. Phys. Chem.*, 1993, v.9, P.3379.

A major drawback to these prior art processes is the low quantity of non-classical fullerenes, nanotubes and buckyonions produced. Typical production rates under the best of circumstances using these processes amount to no more than 1 g/h of a carbonaceous deposit containing 20–60% of nanotubes and 6–20% of buckyonions. Furthermore, the prior art processes are not easily scaled-up to commercially practical systems.

SUMMARY OF THE INVENTION

Accordingly, the present invention provides a method for producing nanotubes or nanoparticles, said method comprising;

a) providing an aromatic hydrocarbon liquid and a solid carbon source; and b) providing energy input, such that said aromatic hydrocarbon liquid produces acetylene.

Preferably, the energy input can be any of the following: electric arcing; resistive heating; laser; electron beam; or any suitable beam of radiation. The energy input has a key role in triggering and controlling the element cracking of liquid hydrocarbons, providing conditions for optimal production of acetylene.

Preferably, the aromatic hydrocarbon liquid contains pure aromatics and mixtures of aromatics with other liquid hydrocarbons, for instance, Co—Ni-naphtenates based on toluene solutions or toluene solutions of sulphur (that is considered to be a promoter of SWNT's growth), etc.

In this invention, we suggest an auto-regulated low-voltage contact electric (AC or DC) arc discharge as a good energy source. Preferably the energy input provides 1–2% of energy required to trigger and control (to drive) the process of cracking aromatic-based liquids. Preferably, Acetylene, provides the bulk of the energy.

To produce fullerenes, it is preferable to create conditions for producing polycyclic aromatic hydrocarbon (PAHC) precursors of the fullerenes and for their interactions with each other to form fullerenes (see Example 1).

The production of fullerenes is enhanced by using selection of the geometry of the electrode system, type of the aromatic hydrocarbon, electrode material and the presence of a buffer gas.

Cracking aromatic liquids provides a maximum ratio of acetylene and carbon vapor to other products of the cracking, that means providing more additional energy released under cracking acetylene. Besides, aromatics have a ringed hexagon structure that simplifies formation of fullerene, nanotube/nanoparticles molecules from polycyclic aromatic hydrocarbon (PAHC) precursors.

Under cracking aromatic-based liquids it is possible to form a very wide range of said PAHC precursors. However, under certain preferable conditions just a few PAHCs are most stable, therefore, interacting (coagulating) with each other, they can form just a few possible combinations of carbon clusters which are annealed to a few different fullerenes. For example, in some aromatic (for instance, benzene) flames the most stable PAHC species are the following three: $C_{16}H_{10}$, $C_{24}H_{12}$ and $C_{38}H_{14}$. If one provides conditions for plasma-chemical interactions (coagulation) between two of these most stable polycyclic precursors, only six variants of the coagulation will be possible.

These six reactions are able to produce following fullerenes:

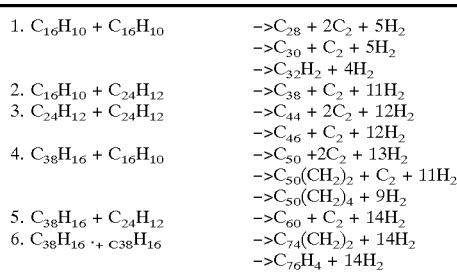

1. $C_{16}H_{10} + C_{16}H_{10}$     $-> C_{28} + 2C_2 + 5H_2$
                          $-> C_{30} + C_2 + 5H_2$
                          $-> C_{32}H_2 + 4H_2$
2. $C_{16}H_{10} + C_{24}H_{12}$     $-> C_{38} + C_2 + 11H_2$
3. $C_{24}H_{12} + C_{24}H_{12}$     $-> C_{44} + 2C_2 + 12H_2$
                          $-> C_{46} + C_2 + 12H_2$
4. $C_{38}H_{16} + C_{16}H_{10}$     $-> C_{50} + 2C_2 + 13H_2$
                          $-> C_{50}(CH_2)_2 + C_2 + 11H_2$
                          $-> C_{50}(CH_2)_4 + 9H_2$
5. $C_{38}H_{16} + C_{24}H_{12}$     $-> C_{60} + C_2 + 14H_2$
6. $C_{38}H_{16} + C_{38}H_{16}$     $-> C_{74}(CH_2)_2 + 14H_2$
                          $-> C_{76}H_4 + 14H_2$

One can see that if one of said precursors is reduced, it will cause a reduction or disappearance of corresponding fullerenes, for instance, for $C_{24}H_{12}$ the corresponding fillerenes are $C_{38}$, $C_{44}$, $C_{46}$ and $C_{60}$. Therefore, if formation of $C_{24}H_{12}$ is suppressed, production of $C_{60}$ (and $C_{38}$, $C_{44}$, $C_{46}$) will be suppressed as well.

Moreover, one can see that it is possible to form some fullerenes preferably, providing conditions for a formation of a single precursor. For instance, $C_{74}(CH_2)_2$ or $C_{76}H_4$ might be produced preferably, if $C_{38}H_{16}$ is the most abundant PAHC species. Further, if proper conditions are provided then to coagulate said fullerenes (or most probably their carbon cluster precursors), it will be possible to form fullerenes higher than $C_{76}$ using plasma-chemical interactions as following:

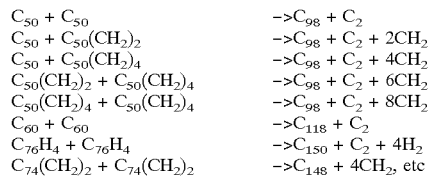

| | |
|---|---|
| $C_{50} + C_{50}$ | $-> C_{98} + C_2$ |
| $C_{50} + C_{50}(CH_2)_2$ | $-> C_{98} + C_2 + 2CH_2$ |
| $C_{50} + C_{50}(CH_2)_4$ | $-> C_{98} + C_2 + 4CH_2$ |
| $C_{50}(CH_2)_2 + C_{50}(CH_2)_4$ | $-> C_{98} + C_2 + 6CH_2$ |
| $C_{50}(CH_2)_4 + C_{50}(CH_2)_4$ | $-> C_{98} + C_2 + 8CH_2$ |
| $C_{60} + C_{60}$ | $-> C_{118} + C_2$ |
| $C_{76}H_4 + C_{76}H_4$ | $-> C_{150} + C_2 + 4H_2$ |
| $C_{74}(CH_2)_2 + C_{74}(CH_2)_2$ | $-> C_{148} + 4CH_2$, etc |

If $C_{50}$ is the most abundant fullerene species, $C_{98}$ will be the highest fullerene species produced.

A buffer gas provides for condensation of carbon clusters to fullerene, nanotube and nanoparticle molecules by moving the carbon vapor away from the reaction site. Preferably, the buffer gas is composed of gases released under the cracking. Optionally, an additional buffer gas may be used to alter the composition of the buffer gas to control of the composition of the carbon allotrope products.

Preferably said additional buffer gas is an inert gas. More preferably said inert gas is Argon.

The buffer gas promotes the processes of formation of higher fullerenes and nanotubes. When producing fullerenes, argon (as well as some oxidants, like $O_2$, air, etc.) suppresses undesirable PAHC precursors and production of anneal carbon clusters to the desirable higher fullerenes. Thus, we found that by increasing argon flow it is possible to suppress PAHC $C_{24}H_{12}$ production, one of the precursors of the fullerenes. Suppression of this precursor leads to a dramatic reduction in the production of $C_{60}$ and some lower fullerenes and allows the production of mainly $C_{98}$.

Preferably, there is an over-pressure above the liquid. When gaseous products of the cracking are released they expand a gaseous (annealing) zone around the reaction site reducing optimal densities of carbon vapor, acetylene and other buffer gases. If the pressure above the liquid is selected to be a predetermined optimum value, the annealing (gaseous) zone will be optimized and fullerene, nanotube/nanoparticle production will be optimized.

Preferably the overpressure is between 0.8 atm and 1.0 atm. The process is preferably carried out inside a hermetically sealed body. The space over a liquid in the body may be evacuated by means of a vacuum pump.

Additional acetylene flow may be required for liquid that generate less acetylene than pure aromatics.

Oxidants, like air or oxygen, may be useful to reduce some fullerene precursors and to modify nanotube/nanoparticle structures.

Halogens (fluorine, chlorine and bromine) may be useful for producing halogenated fullerenes and nanotubes.

Thus, we suggest varying fullerene composition by adjusting conditions for preferable formation of PAHC precursors and their interaction with each other. The main features are an impressing of a buffer gas and an over-pressure as well as varying a composition of the liquid and/or composition of the electrodes, varying a type and voltage of applied electric current.

Further adjustment of the cracking allows performance of a process for continuously producing nanotubes and nanoparticles.

In the case of an electrical energy source, a range of applied voltage for optimal production has been determined. Preferably, the voltage used in nanotube production is in the range 18–65 v. More preferably the voltage used in nanotube production is 20 v–60 v. More preferably the voltage used in nanotube production is 20 v–53 v. More preferably the voltage used in nanotube production is 24 v–36 v. More specific energy values are preferred to form SWNTs (with smaller diameters), buckyonions and, especially, fullerenes rather than MWNTs. Therefore, applied voltages for optimal production of MWNTs should be a bit less than for buckyonions and fullerenes.

The electrical power source may provide either alternating or direct voltage to one electrode.

Where the energy input is provided by an electric arc an over-pressure above the liquid allows increase an electric current through an arc gap without breaking the gap.

The amount of voltage necessary to produce an arc will depend on the size and composition of the electrodes, the length of the arc gap, and the ambient medium (the liquid).

The electrodes may be constructed of any suitable material in any shape, for instance, graphite or metallic anodes in the shape of rectangular or triangle prisms, whole or truncated cylinders, flat discs, semi-spheres etc, placed inside cylindrical or square openings of the graphite, brass or stainless steel matrices.

Preferably electrode material should be electrically conductive and selected to withstand high temperatures on the order of 1500–4000° C.

Preferably the electrode material is graphite. Refractory metals, such as tungsten and molybdenum, may be used to form electrodes. The cathodes material may be selected from usual construction materials, even like brass and stainless steel. These materials are particularly useful when a DC arc is being applied.

As one of the electrodes is movable, an electrical arc between the two electrodes may be started by causing the two electrodes to touch each other, either before or after application of electrical voltage to one of the electrodes, and then the electrodes are separated to a self-arranged gap due to gases released in the cracking process after electrical current is flowing through the electrodes.

Using a free (self-movable) contactor allows the desired gap for the electric arc to be set at a nearly constant value since the electrodes are consumed during producing fullerenes, nanotubes and nanoparticles.

All organic liquids are dielectrics, therefore, there is a threshold of voltage for starting an electric arc discharge in the liquids. Below the thresholds a resistive heating will be an energy source, which is less effective than arcing.

The lower the threshold, the easier to start an auto-regulated process. If the threshold is higher, higher electric power will be released thereby causing a superfluous flow of gases released in the cracking process.

Preferably an auto-regulated valve is used to release gases from the body and to maintain an optimal pressure.

The body is preferably constructed of stainless steel. Opposite-polarity electrodes are placed within the body. An electrode with a smaller cross section may be made as an elongated rod or pipe, said rod from one ending is connected to a power supply, whereas a graphite or metallic contactor suitable for starting the arcing is connected to another ending, and said contactor is free and close to a surface of another opposite-polarity electrode with a bigger cross-section.

The current feedthrough passes through a wall of the body but is insulated from the electrical conductor so that there is no electrical contact between the electrical current source and the body. The opening in the body through which current feedthrough passes is sealed by a seal to prevent either passage of the outside atmosphere into the body or leaking from the body.

Electrical contact between an electrode and an electrical conductor may be made by any means which will provide electrical conduction between the two.

An insulator provides electrical isolation of the electrodes from the body. The insulator also provides a seal to keep the body from outside atmosphere.

To start the apparatus, opposite-polarity electrodes should be adjusted to barely touch. At this time, with the electrodes touching, the electrical voltage source should be activated to apply voltage to a first electrode A in an amount sufficient to cause an electrical current to flow from the first electrode to a second electrode. After current flows, the electrodes are separated automatically because of the gases released under cracking of the liquid, achieving the desired arc gap. In practice, the gap may be very short and the electrodes may appear to touch and the arc may be described as a "contact arc".

When producing fullerenes, the duration of the production (0.5–8 hours) depends on solubility of a produced fullerenes in the treated liquid. In pure aromatic liquids and their mixtures most of the produced fullerenes will be dissolved in the liquid. However, as soon as soot particles appear in the liquid in enough quantities they will adsorb nearly a half of the produced fullerenes. Therefore, using pure aromatic liquids requires extraction of the fullerenes from the both fractions, the liquid and soot.

The amount of voltage necessary to produce an arc will depend on the size and composition of the electrodes, the length of the arc gap, and the ambient medium (the liquid). Aromatic liquids are most preferred as they have lower dielectric constants (within the range 1.5–2.5,chlorobenzene has the lowest of 1.5) than other hydrocarbon liquids, like acetone (of 20), most arenes, etc. Cyclohexane and hexane have nearly the same dielectric constant as benzene (of 2.0), thus, we include them in the range of suitable liquids. Besides, cyclohexane has a ring (hexagon) structure, like benzene, that provides additional opportunities for producing carbon allotropes. Under cracking, hexane easily transforms first to cyclohexane, then to benzene, and cyclohexane transforms to benzene, thus, hexane and cyclohexane are also suitable.

The lower the threshold, the easier to start an auto-regulated process. If the threshold is higher, higher electric power will be released thereby causing a superfluous flow of gases released in the cracking process.

A further solution to these problems is to use an auto-regulated process of the electric arc, which periodically switches off and on an electric circuit. This aspect of the invention is defined in claims 16 to 21 and the following statements.

The device and method for producing fullerenes during a periodical pulsed auto-regulated action of the Electric-Current Arc-Discharged (ECAD) in natural liquid hyrocarbon mediums like diesel fuels, oils etc. is the closest to our invention by a main point and attainable result. The pulsed auto-regulated regime of the ECAD is performed by a contact breaking of the electric circuit. This is due firstly to the lifting of a spherical graphite contactor by the gaseous products released during the action and secondly by switching on the circuit due to the contactor going down under action of gravity to two opposite polarity graphite electrodes made as plates.

The fullerene mixture is produced during the pulsed auto-regulated action of the Electric-Current Arc Discharged (ECAD) in a multi-component hydrocarbon medium liquid. The pulsed character of the action (the ECAD current intensity varies from zero to $j_{max}$ and then to zero) allows the achievement of an optimal current intensity ($j_{opt}$) by choosing a maximum current intensity ($j_{max}$) which is essentially more than the expected value of the optimal intensity ($j_{opt}$). It is important to note that such an action avoids the over saturation of the arc gap by gaseous products.

In accordance with the a third aspect of the present invention there is provided an apparatus for producing nanoparticles and nanotubes, the apparatus comprising a chamber capable of containing a liquid reactant used to produce nanoparticles and nanotubes, said chamber containing at least one electrode of a first polarity and at least one electrode of a second polarity, said first and second electrodes being arranged in proximity to one another and wherein a contactor is fixedly attached to said first electrode.

Preferably, voltage applied across said first and second electrodes may be a direct voltage or an alternating voltage.

Preferably the direct voltage is in the range 18–65 Volts.

Preferably the alternating voltage is in the range 18–65 volts rms.

Preferably the contactor is made from graphite.

Optionally, the contactor is made from Tungsten or Molybdenum.

Preferably said contactor is spherical in shape.

Optionally said contactor is hemisherical in shape.

Optionally said contactor may be prismic with triangle or square cross sections, cylindrical or truncated cylindrical or flat.

Metallic contactors may also be constructed from a rectangular shape of Ti-sponge or Al cylinders Preferably said first electrode is constructed from Tungsten.

Optionally said first electrode is constructed from Molybdenum.

Optionally said first electrode is constructed from carbon containing material.

Preferably said first electrode is rod-shaped.

Preferably, the second electrode consists of a matrix having a plurality of cavities capable of receiving the first electrode.

Preferably, the apparatus contains a gas inlet to allow gas to be supplied to the area at or near the electrodes.

Preferably, said gas is a noble rare or inert gas.

Preferably, said gas is Argon.

Preferably, said apparatus contains cooling means which consist of a cavity in the wall of the chamber through which a coolant is circulated.

Preferably, said chamber contains pressure regulation means for maintaining the pressure inside the chamber at a desired level.

More preferably said desired pressure level is 0.8 to 1.0 atmospheres.

BRIEF DESCRIPTION OF THE DRAWINGS

Reference is now made more particularly to the drawings which illustrate the best presently known mode of carrying out the invention and wherein similar reference characters indicate the same parts throughout the views.

FIG. 1 is a schematic illustration of a first apparatus (Apparatus-1) for producing fullerenes, carbon nanotubes and nanoparticles according to the present invention;

FIG. 2 is a typical TOF ESI-Mass Spectrum of the eluent before filtration through Molecular Sieves of 8/10 Å;

FIG. 3 shows typical TOF ESI-Mass Spectra of the eluents after filtration through Molecular Sieves;

FIG. 4 shows TOF ESI-Mass Spectra of the eluents filtered through the Molecular Sieves after keeping them for three and six months;

FIGS. 5a–d are typical TEM image of deposits produced using an AC arc with applied voltage of 53 Volts in Apparatus-1;

FIG. 6 shows an experimental dependence of the deposits compositions and their outputs versus a DC voltage applied in Apparatus-1;

FIG. 7 is a typical TEM image of deposits produced in benzene using a DC arc with applied voltage of 24 Volts using Apparatus-1;

FIG. 8 is a typical TEM image of deposits produced in cyclohexane using a DC arc with applied voltage of 24 Volts using Apparatus-1;

FIGS. 18a–c show typical TEM images of nanotube deposits produced over Mo anodes at 36V in toluene mixtures.

DETAILED DESCRIPTION OF THE INVENTION FOR PRODUCING FULLERENES

Figure 9:
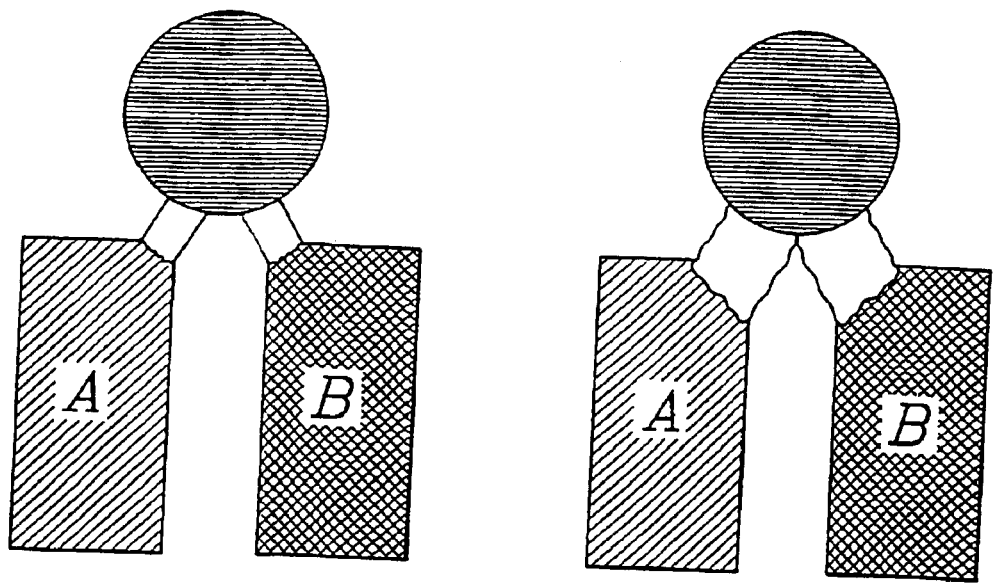
FIG. 9 is a schematic diagram of the cobtactors and electrodes used in a device in accordance with an embodiment of the present invention.

The following example relates to FIGS. 1 to 8 and to the first aspect of the present invention defined above.

An individual cell of the device for producing fullerenes includes a hermetically sealed body 1, in which a holder 2 of the electrodes A (3) and a holder 4 of the electrode B (5), and spherical graphite contactors 6 are situated above the electrodes A below a metallic grid 7. This arrangement is immersed in a hydrocarbon liquid 8 and is connected to a valve 9 for flowing a buffer gas, and to a standard AC power supply 10 typically used for welding (three phase voltage, 53V, 50 Hz). Cylindrical graphite pipes 3 (electrodes A) with a smaller diameter are installed in holder 2 by using cylindrical ceramic insulators 11 and are connected to the holder using safety wires. The pipes are axially installed inside a vertical cylindrical opening of a graphite matrix 5 (electrode B).

FIG. 1 shows a design of the apparatus with 19 pairs of the electrodes/contactors vertically aligned in a compact hexagonal package.

Graphite pipes have a length within a range of 20 to 50 mm or longer and external/internal diameters of 4/1–2 mm provide electrode A3. Corresponding, spherical graphite contactors with a diameter within a range of 11–12.5 mm are put above the pipes onto the cylindrical openings of the graphite matrix 5 (electrode B) and the openings have a diameter within a range of 13–13.5 mm. All the graphite parts were made of a Russian commercial graphite, type MPG-6.

A cylindrical stainless steel body 21 is filled from the top by an aromatic liquid, like benzene, toluene, xylenes, etc or their mixtures to a level that is, at least, enough to cover the spherical graphite 6 contactors. Whatman filters 12 are installed at the top of the body to adsorb soot particles going from the liquid with bubbles of released gases.

Before the apparatus is switched on, air is pumped out from the body 1 through the automatic valve 13 and pure argon gas is pumped through the valve 9 to the pipes to fill the empty space to a pressure that is optimal for producing a required higher fullerene. The pressure is controlled by a manometer 14. Top 15 and bottom 16 lids are made of teflon to provide insulation and the possibility of observing arcing during the process. Water cooling the body (and the liquid) is flowing through the inlet 17 to the outlet 18. Rubber rings 19 seal the body.

A buffer gas pressure in the pipe is controlled on a level that is enough to keep a gas bulb at the pipe tip, so that the gas flow through the arc will be initiated by a temperature gradient automatically as soon as the arc starts.

As soon as the power supply 10 is switched on the process starts. With a normal AC regime an arc is generated between the contactor 6 and electrodes 3,5 by turn, therefore, the both electrodes 3,5 and the contactor 6 are slowly eroded and covered with cathode deposits at the same time, maintaining the electrodes geometry practically constant for hours. Using diodes allows feeding the pipes (electrode A) as anode, so just the pipes and contactors are slowly eroded in the process. This measure halves fullerene yields.

The arc is maintained as bright as possible, i.e. an intensity of the arc's electric current is maintained as high as possible by varying such parameters as a pressure inside the body, a liquid's composition (changing dielectric constant), arc's cross section, the type of a graphite used for the electrodes/contactors, etc. We found that at AC voltage of 53 Volts the arc's intensity of 100–300 A/cm$^2$ is enough to produce C98 with a high yield in benzene-based liquids. It corresponds to an electric current of 3–12 Amp for the arc's cross section of 3–4 mm$^2$ in the above mentioned electrode geometry.

To obtain an optimal regime for the said brightest arc, one can use an oscilloscope to control the dependence of the electric current versus time. Afterwards, an average current is roughly controlled by a proper commercial probe based on the Hall effect. Thus, while using a bigger processor with about 100 pairs of the electrodes an average current is in the range 100–110 Amps, whereas for a smaller processor with 19 pairs of the said electrodes the average current varies within the range of 15–30 Amps.

The duration of the reaction (0.5–8 hours) depends on solubility of a produced fullerene in the treated liquid.

If solubility of the fullerenes is higher than their concentration in the treated liquid, the fullerenes will mostly accumulate in the liquid. For instance, we have found that our apparatus produces C98 in pure benzene with a yield of about 0.4 mg per first 30 min per a pair of the electrodes. The most compact geometry of the apparatus, which allows reduction of the liquid to a reasonable minimum of about 20 ml per pair of electrodes. It seems to be the concentration of C98 of 0.02 mg/ml (after first 30 min), which looks much lower than the solubility for C98 in benzene. For instance, solubility of C60 in benzene is about 1 mg/ml and it is the lowest among aromatic liquids. Therefore, in pure aromatic liquids and their mixtures most of the produced fullerenes will be in the liquid. However, as soon as soot particles appear in the liquid in enough quantities they will adsorb nearly half of the produced fullerenes. Therefore, using pure aromatic liquids requires extraction of the fullerenes from the both fractions, the liquid and soot.

We have successfully produced mixtures of lower and higher fullerenes treating by 120–150 ml of pure benzene (samples 2 and 3) and/or benzene mixed with diesel fuels (samples 1) in an apparatus having one pair of the electrodes for 30 min. Sample 1 was produced without impressing a buffer gas and with an air ambient above the liquid. Sample 2 was produced with impressing argon at flow inlet of about 0.002–0.003 m$^3$/h per cm$^2$ of a total cross section of the arcs. Sample 3 was produced with impressing argon at flow inlet of about 0.001 m$^3$/h per cm$^2$ of the total arc cross section. After the treatment all the liquids were filtered through Whatman N42 (about 0.2 g of soot was collected for samples 1 and by about 1 g of soot was collected for samples 2 and 3). The liquids' and soot samples were dried in a vacuum oven at 70° C. Then dark brown residues of the benzene liquids (samples 2 and 3) and black soot samples were washed for 2–24 hours with hot methanol and/or acetone using magnetic stearer and/or a Soxlet extractor. After the washing the residues (of the liquids and soot samples) were extracted with 100 ml of benzene or chlorobenzene in Soxlet for 6 and 24 hours, correspondingly.

Some of samples were filtered through Molecular Sieves to separate lower fullerenes from higher fullerenes (combination of 8 Å and 10 Å granular sieves by 2–3 grams in a tube with an internal diameter of 11.2 mm). The filtered liquids were concentrated to about 2 ml and about 50 μl of each sample were analyzed by HPLC-MS using an analytical column and Promochem Buckyprep (preparative) column coupled with TOF ESI-Mass Spectrometer VG Bio Lab. Aldrich $C_{60}/C_{70}$ fullerite and Higher Fullerene reference samples were used to calibrate the HPLC-MS device.

FIG. 2 shows HPLC (analytical column, hexane:toluene=95:5, UV signal for 330 nm), TOF ESI-Mass and UV Spectra of samples 1 that were not filtered through Molecular Sieves. TOF ESI-MS and UV spectra of Aldrich fullerite reference sample had features typical for $C_{60}$ and $C_{70}$ only. HPLC diagrams of samples 1 (FIG. 2) demonstrate a presence of numerous peaks, one of them at 3.01 min retention time corresponds to $C_{60}$. MS spectra show that the analytical column regularly elutes $C_{98}$, without any characteristic peaks. UV spectra collected for several registered HPLC peaks confirm this behaviour of $C_{98}$. One can see, that among fullerenes higher than C60, C98 is the main species (~70%) with nearly 20% of C76H4-adduct and about ~10% of C60.

FIG. 3 shows TOF-Mass Spectra of samples 2 and 3 filtered through Molecular Sieves and kept for about 3 month in glass vials. These spectra were obtained by using the HPLC-MS device equipped with the Buckuprep column. According to the spectra of samples 3, C98 was produced with an estimated output greater than 0.4 mg per 30 min per a pair of the electrodes (the arc's cross section is about 3–4 mm$^2$). Thus, operating with 19-pair-electrodes apparatus allows producing greater than 7.6 mg of C98 per 30 min. Traces of $C_{150}$ were found in samples 3.

The Mass Spectrum in FIG. 2 shows that the main fullerene species are $C_{50}$ with adducts (we suppose that these are methylene adducts, $C_{50}(CH_2)_2$ and $C_{50}(CH_2)_4$) and $C_{98}$, whereas $C_{60}$ and $C_{76}H_4$ are in 5 times lower. Species lower than $C_{50}$ fullerene might belong to lower fullerenes ($C_{28}$, $C_{30}$, $C_{32}$, $C_{38}$, $C_{44}$ and $C_{46}$) as well as to polycyclic aromatic compounds (PAC). MS shows that the main PACs for sample 1 are $C_{16}H_{10}$, $C_{24}H_{12}$ and $C_{38}H_{14}$, which usually are found to be the most stable hydrocarbons in aromatic flames.

FIG. 3 demonstrates that most of lower species, including $C_{50}$ fullerene and $C_{50}(CH_2)_2$, were separated from the samples 2 and 3 by using the filtration through Molecular Sieves with pores of 8 and 10 Å. As the Molecular Sieves are not able to separate PACs, one can conclude that the missing species are lower fullerenes and their adducts/compounds, namely $C_{28}$(336 a.u., see MS at FIG. 1), $C_{28}CH_2$ (350), $C_{30}$(360), $C_{30}CH_2$ (374), $C_{32}$(384), $C_{32}O$(400), $C_{38}$(456), $C_{44}H_2$ (530), $C_{46}$ (552), $C_{50}$ (600) and $C_{50}(CH_2)_2$ (628).

One can discover a correlation between concentration of $C_{16}H_{10}$, $C_{24}H_{12}$ and $C_{38}H_{14}$ (precursors) and $C_{50}$, $C_{60}$, $C_{76}H_4$ and $C_{98}$ fullerenes. Relying on the correlation discovered, we suggest that all said fullerenes but $C_{98}$ are produced (under conditions of the described experiment) due to plasma-chemical interactions between two of these most stable polycyclic precursors, namely $C_{16}H_{10}$, $C_{24}H_{12}$ and $C_{38}H_{14}$, as following:

1. $C_{16}H_{10} + C_{16}H_{10}$ -> $C_{28} + 2C_2 + 5H_2$
   -> $C_{30} + C_2 + 5H_2$
   -> $C_{32}H_2 + 4H_2$
2. $C_{16}H_{10} + C_{24}H_{12}$ -> $C_{38} + C_2 + 11H_2$ ($C_{38}$ disappeared when $C_{24}H_{12}$ was strongly reduced)
3. $C_{24}H_{12} + C_{24}H_{12}$ -> $C_{44} + 2C_2 + 12H_2$ ($C_{44}$ disappeared when $C_{24}H_{12}$ was reduced)
   -> $C_{46} + C_2 + 12H_2$ ($C_{46}$ disappeared when $C_{24}H_{12}$ was reduced)
4. $C_{38}H_{16} + C_{16}H_{10}$ -> $C_{50} + 2C_2 + 13H_2$
   -> $C_{50}(CH_2)_2 + C_2 + 11H_2$
   -> $C_{50}(CH_2)_4 + 9H_2$
5. $C_{38}H_{16} + C_{24}H_{12}$ -> $C_{60} + C_2 + 14H_2$ ($C_{60}$ disappeared when $C_{24}H_{12}$ was reduced)
6. $C_{38}H_{16} + C_{38}H_{16}$ -> $C_{76}H_4 + 14H_2$ (it was always presented and so was $C_{38}H_{16}$)

Whereas, $C_{98}$ and, probably, $C_{150}$ are supposedly produced by plasma-chemical interactions between two of $C_{50}$ (or $C_{50}$-adducts) and $C_{76}H_4$ as following:

$C_{50} + C_{50}$ -> $C_{98} + C_2$ 24/52
$C_{50} + C_{50}(CH_2)_2$ -> $C_{98} + C_2 + 2CH_2$
$C_{50} + C_{50}(CH_2)_4$ -> $C_{98} + C_2 + 4CH_2$
$C_{50}(CH_2)_2 + C_{50}(CH_2)_2$ -> $C_{98} + C_2 + 6CH_2$
$C_{50}(CH_2)_4 + C_{50}(CH_2)_4$ -> $C_{98} + C_2 + 8CH_2$
$C_{76}H_4 + C_{76}H_4$ -> $C_{150} + C_2 + 4H_2$

Using different regimes (for instance, with DC of 24 Volts) we found wider distributions of produced higher fullerenes, including $C_{84}$, with a presence of $C_{50}$, $C_{60}$, $C_{76}$ and $C_{98}$ as well.

$C_{98}$ appears to be the most stable fullerene species among those present in sample 3. We repeated MS tests for the sample after keeping it for about 3 months in the testing vials. Residues were dissolved with toluene and injected in the TOF Mass Spectrometer directly. FIG. 4 shows mass spectra of the filtered eluents (samples 3) after keeping them for about three month after filtering through Molecular Sieves (FIG. 4a) and then after keeping them in the testing plastic vials for an additional 3 months (FIG. 4b). Mass Spectra revealed mainly $C_{98}$ and traces of $C_{150}$ (FIG. 4b), whereas PAC $C_{34}H_{16}$ was at nearly the same level as it was before. Notice that residues of samples 3 diluted with toluene demonstrate no "chlorinated" species.

Using our process and apparatus it is possible to produce a desirable fullerene preferentially, i.e. with few admixtures of other fullerenes and without using HPLC preparations. For instance, $C_{98}$ has been already produced at mg-scales. Changing regimes of the arc allows variation in the a composition of the PAC precursors and, finally, varying the composition of higher fullerenes produced.

One can understand that C50 and other lower fullerene species adsorbed by the Molecular Sieves could be extracted from them by a certain elution. Thus we might have additional by-products, C50, C46, C44, C38, C32, C30, C28, etc.

A proportional increase of the output is possible if the fullerenes are accumulated in the soot particles. If solubility of the fullerene in the treated liquid is very low, the fullerene will be forced out of solution by species having better solubility (for instance, PAHCs), so that the fullerene molecules will be continuously adsorbed by soot particles and precipitated to the bottom of the body, preventing their decomposition by the process. This allows operation for an unlimited time, accumulating the fullerenes adsorbed by soot on the bottom of the body and, afterwards, isolating them from the soot using certain washing and extraction procedures. However, cracking liquids with low solubility of fullerenes (like acetone, methanol, etc) does not produce fullerenes with an output that is enough for research & industrial applications.

Therefore, we suggest that the operational time under producing fullerenes should be limited to the time when the liquid becomes unsaturated by PAHCs.

Example 2. Producing nanotube/nanoparticle deposits with an AC arc using the Apparatus of FIG. 2.

Apparatus 1 can be used (FIG. 1) to produce nanotube deposits over the electrodes 3,5.

The body is filled by an aromatic liquid 8, like benzene, toluene, xylenes, Co- and Ni-naphtenates based on toluene, etc., or their mixtures to a level that is, at least, enough to cover the contactors 6.

Before the reaction commences, air is pumped out from the body through the outlet of a safety valve 13 and pure argon gas is pumped through the inlet 9 and through the pipes 3 (electrode A) to fill the empty space 19 to a pressure that is optimal for producing carbon nanotubes/nanoparticles, most preferably, in the range of 600–800 Torr. Afterwards, an argon flow through the opening is maintained in the range of 1–3 liter per hour per a pair of electrodes, i.e. about 20–60 liters per hour for this apparatus.

As soon as the power supply 10 is switched on the process starts. With a normal AC regime an arc is generated between the contactor 6 and electrodes 3,5 by turn, therefore, the both electrodes 3,5 and the contactor 6 are slowly eroded and covered with the deposits at the same time.

Argon flow in the pipe/opening provides the optimum conditions under which formation of nanotube/nanoparticle deposits starts.

The production of nanotube deposits starts at first turn in the opening in which argon flow is higher. In this case, electrodes A3 are made as rods without openings. All electrodes A3 are connected to the electrode of a power supply 10 by means of a safety wire that melts when a process of formation of a nanotube/nanoparticle deposit around a certain electrode is finished.

One can understand that the apparatus is able to produce the deposits even if electrodes A3 are placed inside the matrix's openings horizontally.

All 19 electrode pairs used in this example are simultaneously fed by the power supply. The arcing between different pairs is self-arranged in line. An electric current through a certain arc gap increases while a deposit grows downward. While an edge of the deposit achieves a bottom of the opening the current increases up to 30 Amps. At this point, and the safety wire is melted and deposition stops. As soon as the process is finished in one opening the next pair of electrodes, where the argon flow is optimal, start producing a deposit.

An AC voltage of 53V produces about 1 gram of carbonaceous deposit per 1 min per a pair of electrodes. In nearly 20 min the apparatus with 19 pairs of electrodes produces about 20 grams of the deposit.

According to Transmission Electron Microscope (TEM) pictures (see FIGS. 5, a–c), nanotubes appear as MWNTs with diameters within the range from 2 to 20 nm, whereas buckyonions appear with sizes within the range of 4–70 nm. According to X-Ray Diffraction (XRD) profiles, these deposits mainly consist of graphitic carbon (from 15 to 65%) rather than MWNTs/buckyonions (total sum is within the range 15–25%). Tangled SWNTs are presented in the deposits (see a SWNT bundle at FIG. 5c). SWNTs' diameters and lengths are estimated within the range of 2–5 nm and 300–500 nm, correspondingly.

Using diodes allows feeding the pipes (electrodes A) as anodes, so just the pipes and contactors are slowly eroded in the process. FIG. 5d shows a typical TEM image of deposits produced with 3-phase current rectified with diodes to a pulsed positive (at electrodes A3) mode current.

Using lower voltages looks more preferable as it allows producing the deposits with higher concentration of nanotubes.

However, producing nanotubes and nanoparticles is more preferable with using a DC arc.

Example 3. Producing nanotube/nanoparticle deposits with a DC arc in Apparatus 1

DC regimes appear to be more preferable for producing nanotube/buckyonion deposits. FIG. 6 shows an experimental dependence of the deposits compositions and their yields versus a DC voltage applied. From this dependence one can see that in this apparatus producing nanotube/nanoparticle deposits starts at voltage of about 20 V.

The most preferable voltage for producing MWNTs is within the range from 24 to 30V with the deposits' yields of 0.4–1.0 g/min, correspondingly. Increasing applied voltages over 36V are likely increase yields of buckyonions, graphite and metal clusters.

Increasing the applied voltage over 28–30 Volts requires putting one or two additional contactors above the usual one to maintain optimal arcing (these additional contactors are not eroded at all and may be used many times).

There are two different kinds of deposits, "hard" shells and "soft" deposits, in this geometry of the apparatus.

Surprisingly, the shells are formed around the contactors when the contactors work as anodes and, therefore, the contactors are eroded during the production. In TEM pictures deposits appear as plenty of MWNTs with a rather narrow diameter distribution about 6 mn±1 nm with about 6±1 layers (see FIG. 7).

With a DC regime cathode (the matrix) is not eroded, whereas the contactors are eroded in a high extent and the anodes (pipes or rods) 3,5 are eroded slowly.

For an applied voltage of 24V TEM, XRD and Raman spectrometry show a composition of the shells as following: MWNTs=30–40%, Buckyonions=10–13%, amorphous carbon=25–30%, SWNTs=25–30%, graphite=0–6%, metals=1–2%.

The "soft" deposits are formed around the electrodes A (anodes) in case the pipes are eroded instead of the contactors. These "soft" deposits are characterized by nearly the same composition as the shells but without admixtures of graphite.

For producing nanotubes/nanoparticles, the process may be continued until the deposits have grown over the whole elongated electrodes, at which time the electrical voltage may be withdrawn automatically by using safety wires or any other suitable sensor.

Separation of carbonaceous deposits from the electrodes may be made mechanically, for instance by scrapping deposits.

Separation of nanotubes/nanoparticles from amorphous carbon may be made by a "soft" oxidation in air at temperature of about 350° C. for several hours (12–24 h). For bulk samples such a procedure prevents overheating of the samples because of a huge energy released under oxidation of soot particles. Then metals might be removed by an accurate treatment with inorganic acids ($HNO_3$, HCl, HF, $H_2SO_4$ or mixtures of their from) at room temperature (to prevent oxidation of spherical ends of nanotubes and filling the opened nanotubes with metal-containing acid solution), decanting a nanotube/nanoparticle residue and washing the residue with water. Afterwards, carbon nanoparticles (onions) might be oxidized in air at 535° C. for several (normally, 1–4) hours.

Table 1 shows parameters of our carbonaceous deposits produced with DC voltage of 24 V using different liquids and materials of the electrodes.

TABLE 1

| | Deposits | Liquid | Material of the Electrodes | Yield g/min | MWNT | Onions | SWNT Soot | Graphite | Metals |
|---|---|---|---|---|---|---|---|---|---|
| 1 | Shells + Soft | Benzene | A, B, C - MPG6 | 0.5 | 35 | 11 | 53 | 0 | 1 |
| 2 | Shells + Soft | Toluene | A, B, C - MPG6 | 0.4 | 33 | 13 | 53 | 0 | 1 |

TABLE 1-continued

| | Deposits | Liquid | Material of the Electrodes | Yield g/min | MWNT | Onions | SWNT Soot | Graphite | Metals |
|---|---|---|---|---|---|---|---|---|---|
| 3 | Shells + Soft | Benz + 3.3% Naphtaline | A, B, C - MPG6 | 0.6 | 31 | 12 | 52 | 4 | 1 |
| 4 | Shells + Soft | Acetone + 30% wt. of Benzene | A, B, C - MPG6 | 0.13 | 55 | 15 | 30 | 0 | 0 |
| 5 | Shells + Soft | Cyclo-Hexane | A, B, C - MPG6 | 0.14 | 40 | 25 | 35 | 0 | 1 |
| 6 | Shells + Soft | Benzene | A, C - MPG6 B - brass | 0.41 | 25 | 9 | 59 | 6 | 1 |
| 7 | Shells + Soft | Benzene | A, C-MPG6 B - S/Steel | 0.36 0.36 | 39 39 | 15 15 | 44 44 | 0 0 | 2 2 |
| 8 | Shells + Soft | Benzene | A, C-MPG6/ 3% wt. Co/ 3% wt. Ni B - MPG6 | 0.35 | 30 | 10 | 58 | 0 | 2 |
| 9 | Shells + Soft | Benzene | A, C-MPG6/ 3% wt. Co/ 3% wt. Ni B - S/Steel | 0.35 | 33 | 11 | 52 | 0 | 2 |

One can see that producing nanotubes using different aromatic liquids (regimes 1, 2 and 3) is nearly the same.

Using cyclohexane produces the deposits in 3 times less but with higher contents of MWNTs and, especially, buckyonions. FIG. 8 shows a typical TEM image of deposits produced in cyclohexane. One can see that MWNTs are mainly short, some of them are bent but practically all of them have nearly the same diameter. Such MWNT shapes and higher buckyonion contents could be predicted having in mind a lower temperature of cyclohexane cracking (first to benzene molecule) and weaker C—C bonds in the molecule ring.

There is no production of nanotubes when pure acetone is used. The production starts when about 30% wt. of benzene is added to acetone and the deposit's yield is reduced proportionally on reducing the content of benzene.

However, one can see that diluting aromatics with hydrocarbon liquids, like acetone, allows increasing relative outputs of MWNTs/buckyonions up to 70% wt.

Using different material for electrode B (cathode) does not influence the output of the deposits. However, using a stainless steel (SS) matrix leads to the production of only "soft" deposits enriched by MWNTs and slightly depleted by SWNTs. Besides, only anodes (electrodes A) are eroded with a stainless steel matrix, i.e. arcing is situated just between the anodes (pipes/rods) and contactors.

Using a brass matrix leads to a slight reduction of MWNTs/onions and an increase of soot/SWNT and graphite contents. With a brass matrix both the anodes and contactors are eroded.

Raman spectrometry, XRD and TEM show that impregnating electrodes A (pipes) and C (contactors) with Co and Ni oxides leads to an increase of SWNTs up to 40% wt., whereas total yields of the deposits are nearly the same as without Co and Ni catalysers.

Adding soluble organometallic compounds to the liquids, like Fe-, Co- and Ni-naphtenates in toluene solutions, allows increasing yields of SWNTs due to the simultaneous production Fe, Co and Ni nanoclusters which catalyze SWNTs' growth.

Dissolving sulpur or sulphur compounds in the liquids promotes SWNTs' growth further. Where using elemental sulphur dissolved in toluene up to concentration of 2–7% wt. is used, a new form of SWNT deposit appears, very thin "cloths" or "rags" are deposited on walls of the body. We preliminary found that such deposits were mainly composed of SWNTs (50–60% wt.), amorphous carbon (30–40% wt.), carbon (5–10% wt.) and metallic (3–6% wt.) nanoparticles. Nevertheless, the most part of SWNTs is deposited together with MWNTs as cathode deposits.

Increasing the distance between the anode base (holder) and the matrix (cathode) allows growth of deposits outside the cathode matrix's openings. The deposits grow side-ward and downward (toward the anode base) over the anodes due to arcing between an edge of the deposits (cathodes) and side surface of the anodes, like the "soft" deposits grow, but cross sections of the deposits are in 2 times greater than that of deposits grown inside the openings. We found that composition of said "outside" deposits is nearly the same as composition of deposits grown inside the cathode openings and nanotubes' yields are essentially higher (in 1.3–1.6 times) than with growing inside the openings. The deposit growth continues until all the anode is covered with the deposit.

This fact opens a lot of opportunities for continuous growth of nanotube deposits. We found, that the cathode (matrix) is required just to start the arcing (to create deposits) and afterwards the arcing goes between anodes and deposits (cathode), therefore, elongating anodes is enough for providing a continuous production of nanotube/ nanoparticle deposits whereas the cathode matrix might be made as "short" as possible.

Elongated metallic rods or pipes might be very useful to provide such processes in the Apparatus of FIG. 2. We found that stainless steel rods/pipes are not very suitable anodes because of their low melting points, whereas tungsten and molybdenum anodes are good enough to replace graphite electrodes.

We use the same apparatus (FIG. 1) as described above with 6–7 anodes simultaneously fed by the DC power supply. The arcing between different pairs is self-arranged in line. An electric current through a certain arc gap increases while a deposit grows over the anode downward from the matrix's opening (soft) or around the spherical contactor (shells). When either an edge of the deposit reaches a bottom of the opening or a surface of said shells closely contacts a surface of the matrix's opening (cathode), the current increases up to 30 Amps and the safety wire is melted and production of the deposit is stopped. As soon as the process is finished in one opening the next pair of electrodes, where the argon flow is optimal, starts producing a deposit.

Arranging feeding by 7 anodes (electrodes A FIG. 2) simultaneously allows constructing apparatuses as big as possible, for instant with several hundreds of said electrode pairs.

With our apparatus of 19 anodes we produce about 10 grams of the deposit per 20 min of operation, applying a DC arc voltage of about 24 Volts. TEM picture (FIG. 7) shows a high quality of the deposit as produced. TEM, XRD and Raman spectrometry show a composition of the deposit as following: MWNTs=30%, Buckyonions=10%, amorphous carbon=32%, SWNTs=25%, metals=3%.

Afterwards, we used "soft" oxidation of the deposit in air at 535° C. for about 20 hours. The oxidation reduced the deposit in two times (to 10 grams) but it allowed developing composition of the deposit as following: MWNTs=52%, Buckyonions=1%, amorphous carbon=1%, SWNTs=41%, metal oxides=5%.

Metal oxides can be removed by dissolving in any suitable inorganic acid (we use $HNO_3$, HCl, HF, $H_2SO_4$ and mixtures their of), though allowing producing deposits containing 98–99% of carbon nanotubes.

In the present invention, the production and use of acetylene releases a huge amount of energy under cracking. Therefore, the idea is to drive the process of cracking liquid hydrocarbons so that a proper amount of acetylene is continuously produced and cracked. This is achieved by means of the external energy input. Supplying the process with extra energy causes an increase of the products' yields by 10–100 times in comparison to conventional processes of producing fullerenes, nanotubes and nanoparticles. Doing analogies with nuclear reactor, we suggest using a so-called "sub-critical mode" of the reactor where chain reactions of fission of uranium-containing mixture occurs under driving by an external source of neutrons only, i.e. as soon as neutron source is switched off, the fission process is over.

In our case, as soon as said external source of energy (arc, laser, etc.) is switched off the process of cracking is stopped (no acetylene is produced). As soon as the source is switched on, the process starts.

If said energy input does not create conditions for acetylene production with a proper yield the product yields will be at the same levels as in the prior art processes.

On the other hand, if pre-conditions correspond to so-called "critical mode" in which the energy source creates the correct conditions, the chain reaction of acetylene cracking will occur and special means (for reducing rate of the reaction) will be required to maintain the reaction at a proper level.

The following example relates to FIGS. 9 to 12 and to the second aspect of the present invention defined above.

The device and method mentioned above is able to produce a relatively high yield of higher fullerenes, i.e. the amounts of C84 and C60 may be comparable.

However, fullerene outputs are low (about 10 mg per processor) because of the rapid undesirable erosion of a surface of the electrodes during the arc action (see FIG. 9). As a result of this erosion, the cross section of the electric arc discharge is increased with time reducing the intensity of the arc's current and the temperature of the carbon clusters' plasma. After 5–10 minutes of the process, judging by the sizes of the electrodes and contactor, this reduction leads to the termination of the fullerene formation process. A minimum current intensity (about 100 $A/cm^2$) is required to form C60/C70 and higher in such a process.

In conclusion, light fullerenes (C28 to C50) and soot particles are mainly produced by this method, in turn reducing the yield of the higher fullerenes and C60. A prevalence of light fullerenes in comparison to C60 and higher fullerenes complicates valid detection and separation of the higher fullerenes.

An absence of a buffer gas and the presence of oxygen (from air) are added factors that reduce fullerene/nanotubes yields.

An important factor in reducing fullerene/nanotube yield is prevailment of alkanes/alkanes and cycloalkanes ($C_nH_{2n+2}/C_nH_2$ and $C_nH_{2n}$)in the natural liquid mediums (i.e. petrol consisting of 1.5–6% of petane, isopentaes 0.5–2%, hexane 3–9%, isohexane 1–4%, heptane 3.11%, isoheptane 3–6%, octane 5–9%, isooctanes 5–9%, nonane 3–6%, isononanes 4–9%, cyclopentane 0.1–0.5%, methylcylopentane 2.5–5% 0.2–2%, toluene 1–5%, xylenes 2–7%). During cracking alkanes/alkenes produce two times greater amounts of hydrogen in comparison to aromatic hydrocarbons (nearly $C_nH_{n-x}$) and it is known that superfluous amounts of hydrogen restrain formation of fullerenes/nanotubes.

In order to achieve a technical result, in other words greater amounts of the higher fullerenes and carbon nanotubes at a relatively low cost, it is necessary to increase the relative yield of the higher fullerenes/nanotubes and omit HPLC as a method of fullerene separation. Thus, the problem of the conception of the method and device for producing higher fullerenes/nanotubes with an attainable technical result, greater amounts of the higher fullerenes/nanotubes with a relatively low cost, is maintained.

A solution of the method and device problems for producing higher fullerenes and nanotubes is achieved by two variants.

The first variant is only used if it is possible to compose the liquid of aromatic hydrocarbons which dissolve a required fullerene better than other fullerenes including C60. It is known from D. K. Modak et al., *Indian J. Phys.*, 1993, v.A67, p.307; and Oshima et al., U.S. Pat. No. 5,482,601, Issued Jan. 9, 1996, *Method and Device for the Production of Carbon Nanotubes*; Olk, U.S. Pat. No. 5,753,088, Issued May 19, 1998, Method for Making Carbon Nanotubes; and Chang, U.S. Pat. No. 5,916,642, Issued Jun. 29, 1999, *Method of Encapsulating a Material in a Carbon Nanotube*, which are hereby incorporated by reference, that aromatic liquids (benzene, tolulene, xylenes etc.) dissolve C60 and higher fullerenes differently, i.e. at room temperature (20° C.) toluene dissolves C60 (~2.8 g/l) two times better that C70 (~1.4 g/l) but o-xylene does it differently, solubility of C60 is 5.2 g/l whereas of C70 is 14.3 g/l. As a rule solubility of C60 reduces when an increase of temperature occurs, whereas solubility of higher fullerenes increases with temperature increase.

Moreover, the fullerene/nanotube mixture is produced in a presence of argon gas in a multi-component aromatic hydrocarbon liquid which dissolves the required higher fullerenes better that other fullerenes including C60. Furthermore, the action is continued until the liquid dissolves the higher fullerenes. In that case, the required higher fullerene completely forces out other fullerenes (including C60) from the solution (liquid) to a soot/nanotube precipitation due to better solubility. In this case it is sufficient to separate the treated liquid (mostly containing the higher fullerene) from the soot/nanotube precipitation (with the rest of the fullerenes including C60 adsorbed) by filtering through Whatman filters.

The liquid is then filtered through a certain layer of molecular sieves with pore diameters of 8–10 Angstroms, which selectively adsorb light fullerenes (less than C60 namely, C28–C50). Taking into consideration the lack of information regarding the solubility of light fullerenes, the molecular sieves completely adsorb any molecules with sizes less than 7 Angstroms. The latter do not adsorb molecules with sizes equal or more than 7 Angstroms i.e. C60 and higher fullerenes are not adsorbed by the molecular sieves. The "cleaned" liquid is then evaporated in vacuum to form a crystalline powder of the higher fullerene.

By using the Whatman filters the sediment is dried in a vacuum oven and cleaned by washing. For washing certain organic solvents which have a minimal solubility for fullerenes are used, the best of which are methanol (solubility of C60 is about 0.035 mg/l), acetone (1 mg/l) and pentane (5 mg/l).

Subsequently the remaining fullerenes are eluted from the cleaned sediment by benzene toluene xylene etc. The formed solution is evaporated in vacuum to form a C60 and higher fullerenes with a small admixture of the required higher fullerene crystalline powder.

The nanotubes in turn are separated from the remaining soot by a specific oxidation process. We suggest using a treatment of the carbon (soot/nanotubes) remainder. This is done by adding and boiling concentrated nitric acid during 1–2 hours in order to open the nanotubes caps and thus separate the nanotubes from the soot particles. Finally, a centrifuge with a low rotation velocity (500–1,000 min$^{-1}$) is used to separate the nanotubes from the rest of the soot particles.

Under such a separation the rest of the soot particles, which are spherically shaped with sizes (1,000–2.000 Å) and larger than those of the nanotubes lumps (300–1,000 Å), are precipitated in the first turn forming a black sediment at the bottom of the vials, whereas, the nanotubes form a dark-orange gel with the acid. One can separate this gel into fractions by taking part of the gel layer-by-layer. Each of the gel fractions contains lumps of SWNTs with nearly the same sizes. Such a separation is checked simply and obviously. Therefore one can have an additional product, carbon nanotubes, as well as producing higher fullerenes by our method and device.

The second variant is destined if it is impossible to compose a liquid of aromatic hydrocarbons, which dissolved a required higher fullerene better than other fullerenes including C60.

In this case the fullerene mixture is produced in a multi-component aromatic hydrocarbon liquid which dissolves the required higher fullerenes less than other fullerenes including C60. The action is continued until the liquid dissolves the remaining fullerenes including C60 up to a moment when their concentration becomes equal to the limit of their solubility in the liquid.

In these conditions, other fullerenes (including C60) force out most of the required higher fullerenes to a soot/nanotube precipation. Therefore, the higher fullerenes might be separated from the rest of the fullerenes by using Whatman filters.

After drying and cleaning the separated soot sediment (as in the above-mentioned method), the required higher fullerenes are eluted from the sediment by a certain solvent (benzene, toluene, xylene, chlorbenzene etc.) with the help of Soxhlet extractor.

Thus, these two variants of the method allow us to produce any higher fullerene and separate it from the rest of the fullerenes by composing a liquid with higher or lower solubility of the higher fullerene than that of others.

These variants are realised by the device as following (see FIG. 10):

The device differs from the prototype by a geometry of the electrode system: cylindrical graphite pipes (electrode A FIG. 10) are installed axially in vertical cylindrical openings of a cylindrical graphite matrix (electrode B FIG. 10) and spherical graphite contactors are placed above the pipes. One notices that such a geometry maintains the constancy of the arc discharge cross section (therefore, constancy of the arc temperature) as it is defined by a cross section of the pipes, which is kept constant from the top to bottom.

Figure 10:
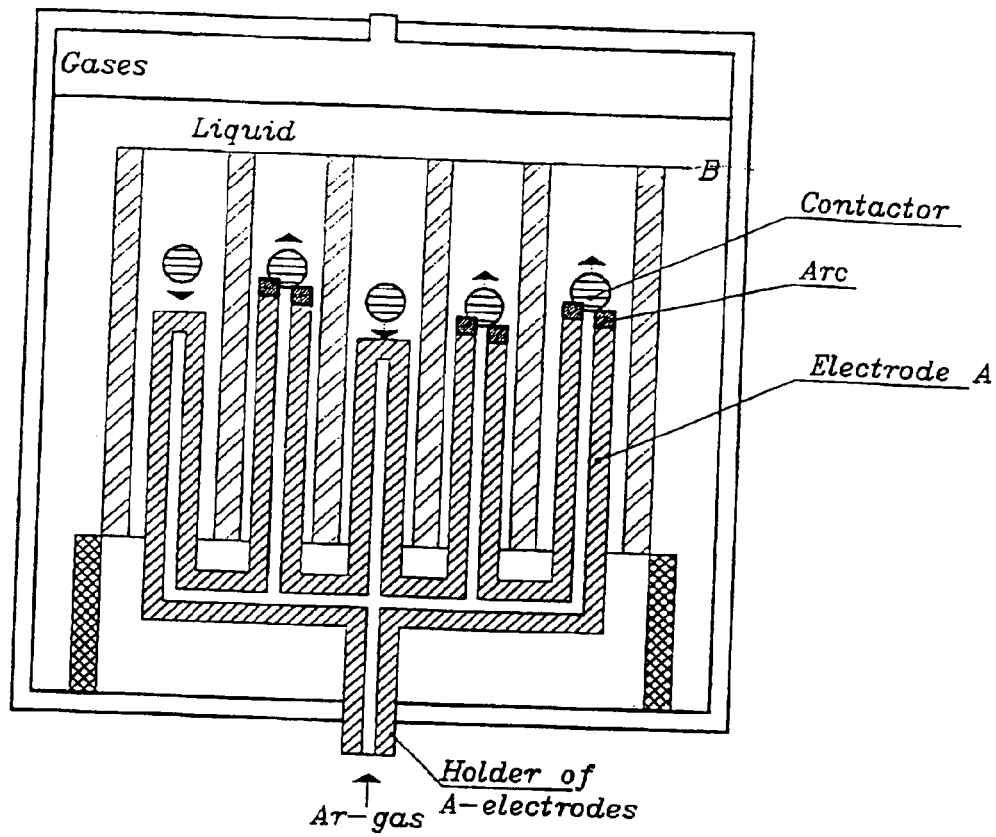
FIG. 10 is a schematic diagram of a device in accordance with a first aspect of the present invention.
Figure 11:
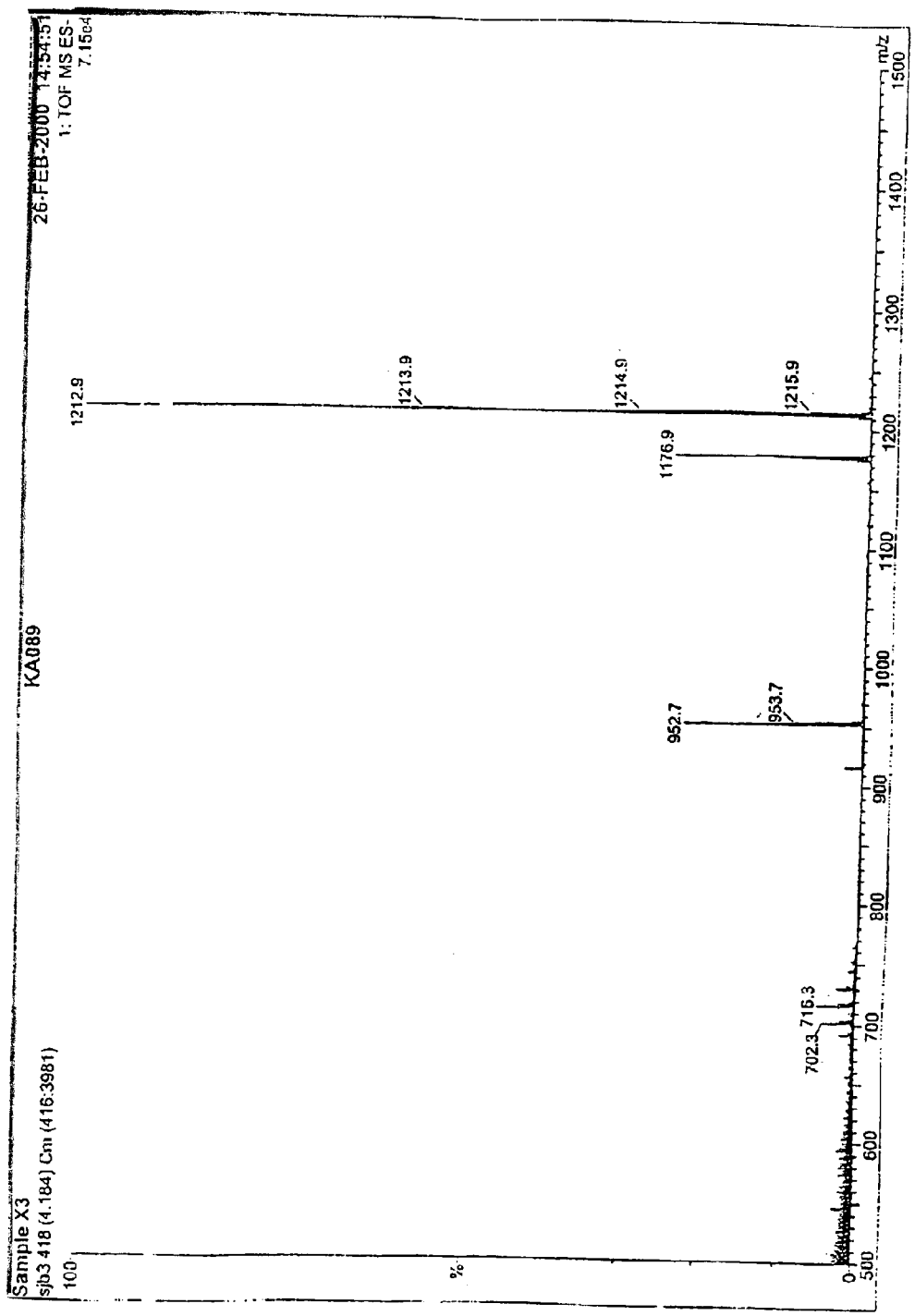
FIG. 11 is a Time-of Flight Mass Spectrum of a sample produced by the method and apparatus of the present invention.
Figure 12:
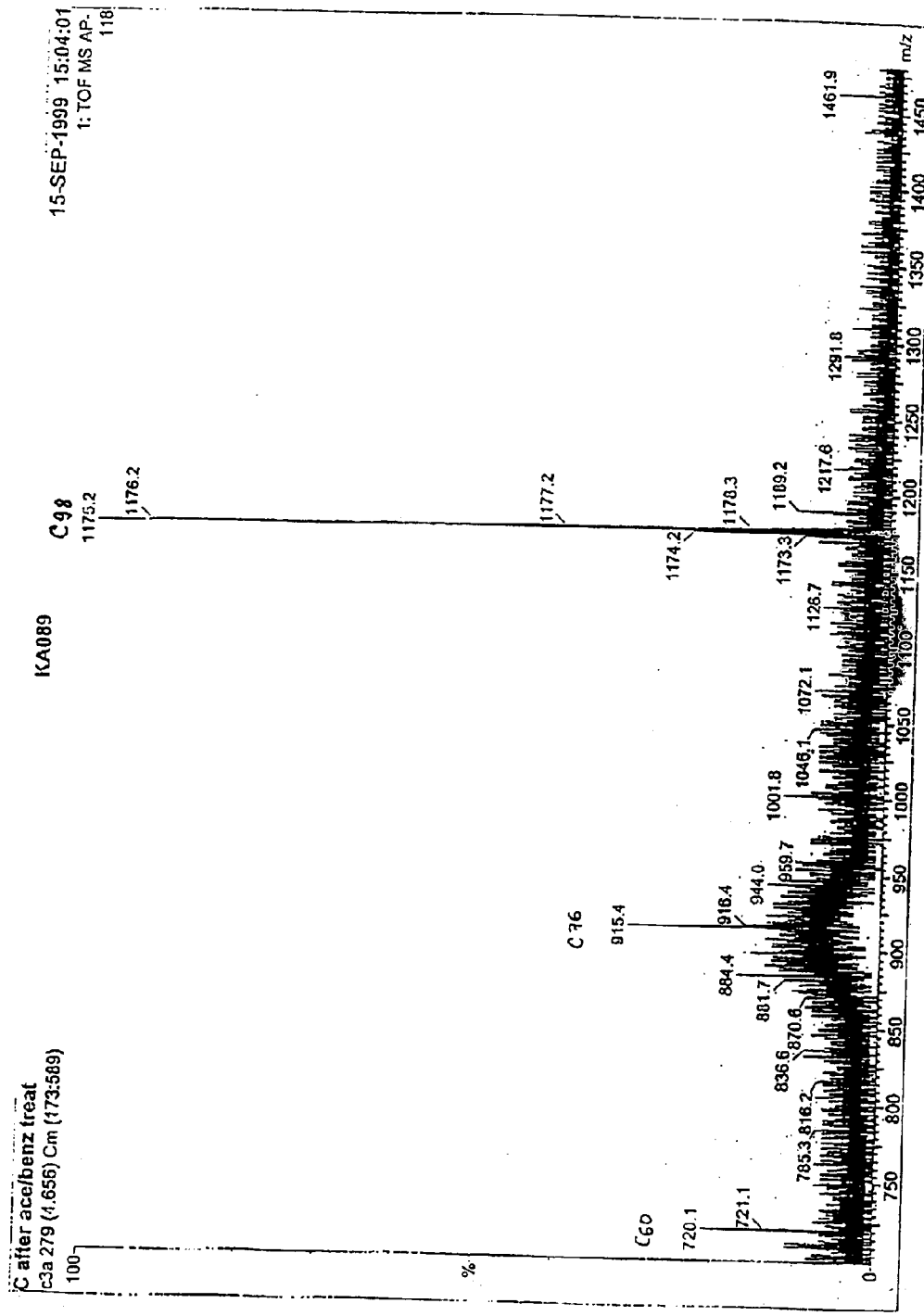
FIG. 12 is a Time-of Flight Mass Spectrum of a sample produced by the method and apparatus of the present invention.
Figure 14:
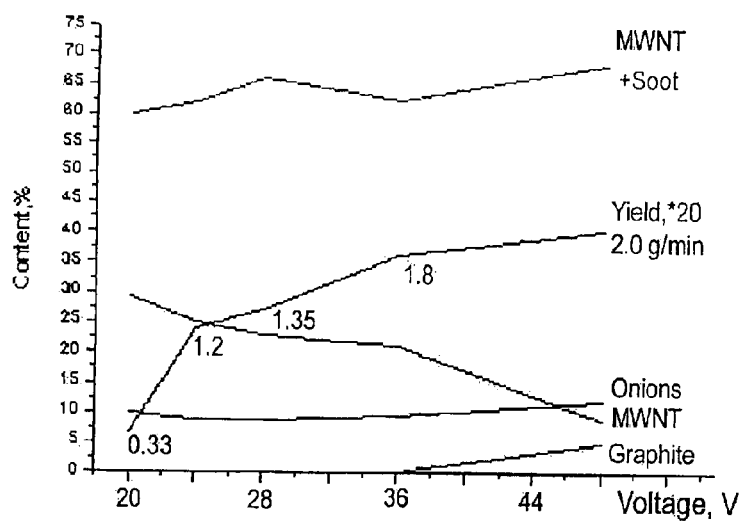
FIG. 14 shows an experimental dependence of the deposits compositions and their outputs versus a DC voltage applied in the apparatus of FIG. 1.

With this pipe geometry of electrode A FIG. 10, it becomes possible to pump Argon gas through the pipes to a space of the arc discharge. It is performed before and during the action of the arc discharge, thus allowing the removal of oxygen from the liquid, and avoiding fullerenes oxidation, and thus creating optimal conditions for carbon clusters annealing to fullerenes/nanotubes.

The body is filled by the hydrocarbon liquid to a level above the contactors to provide a maximum average duration of individual acts of the arc discharge. It allows increasing temperature yields of the higher fullerenes because the interval, when the arc temperature is maximum, becomes greater.

Both variants have been tried.

The device was made with the following: Graphite pipes (electrode A FIGS. 9 and 10) with a length of 50 mm and external/internal diameters of 4 and 2 mm, correspondingly, spherical graphite contactors with a diameter of 12.5 mm and vertical cylindrical openings of a graphite matrix (electrode B FIGS. 9 and 10) with a diameter of 13.5 mm. A cylindrical stainless steel body was filled with a liquid (based on a benzene solution of some aromatics like naphthalene, toluene and xylenes) to a level of 50 cm above the contactors. Such a level provided the maximum duration of the arc action as was found in our experiments. Pure argon gas was pumped through the graphite pipes (electrode A FIGS. 9 and 10) before the action (to remove air from the body and liquid) and during the action, thus creating optimal conditions for carbon clusters annealing to fullerenes/nanotubes. The arc's cross section was about 3–4mm$^2$ and the intensity of arc's current was in the range of 100–400 A/cm$^2$. The duration of the action (4–6 hours) depends on the type higher fullerene required and, therefore, on the variant of the method and nature of the liquid, which are used for producing fullerenes/nanotubes.

By using the first variant we produced a mixture of higher fullerenes (see HPL-Chromatograms and Mass Spectrum at FIG. 11), mainly containing C98 (~80%) with nearly 3% of C76 and 15% of C78 and with a total output in the range of 2–20 g per processor per cycle (of 5 hours duration).

The second variant was used to produce a fullerene mixture mainly containing C98 (~70%) with nearly 20% of C76 and about 10% of C60 (see MS Spectra at 4/4), with a total output in the range of 1–10 g per processor per cycle (of 5 hours duration).

An additional output of nanotubes is estimated in the range of 100–300 grams per processor per cycle. These nanotubes appeared as short (300–1,000 Å) ropes of SWNTs with average diameters of individual nanotubes in the range of 10–15 Å as estimated by Kr Adsorption-desorption processes using our original XRF-based technique (Z. Shi et al., *Mass Production of SWNT by Arc Discharge Method*, Carbon, v. 37, n.9, pp. 1449–1453, 1999).

Consequently, the technical result of our invention was the production of large amounts of the higher fullerenes and nanotubes with a relatively low cost.

The following example relates to FIGS. 13 to 19 to 12 and to the first and third aspects of the present invention defined above.

The apparatus for producing fullerenes includes a hermetically sealed chamber 101, in which a holder 102 of the electrodes A 103 and a holder 104 of the electrode B 105, and fixed spherical or hemispherical graphite contactors 106 are situated above the electrodes A below a metallic grid 107. This arrangement is immersed in a hydrocarbon liquid 108 and is connected to a valve 109 (for adding a buffer gas into the chamber 101 around the electrodes), and to a standard AC power supply 110 typically used for welding (three phase voltage, 53V, 50 Hz).

Cylindrical rods 103 (electrodes A FIG. 13) with a smaller diameter are installed in holder 102 by using cylindrical ceramic insulators 111 to the holder using safety wires. The rods 103 are axially installed inside a vertical cylindrical opening of a graphite matrix 105 (electrode B FIG. 13).

Figure 13:
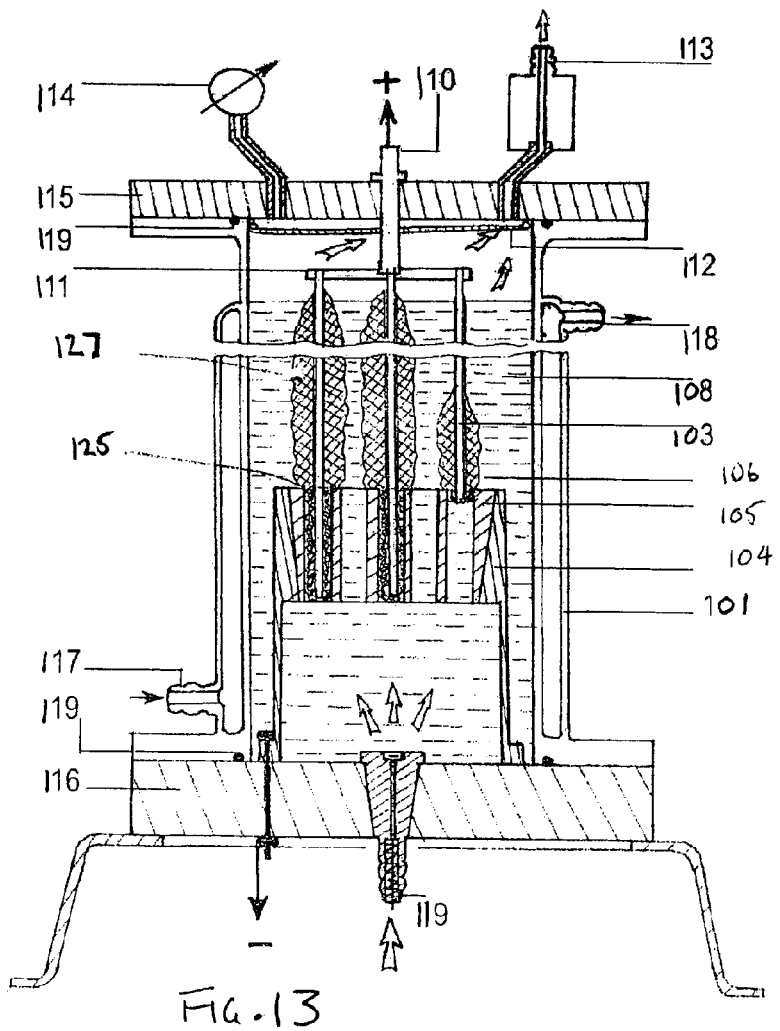
FIG. 13 is a schematic illustration of an apparatus for producing carbon nanotubes and nanoparticles according to the present invention.
Figure 15A:
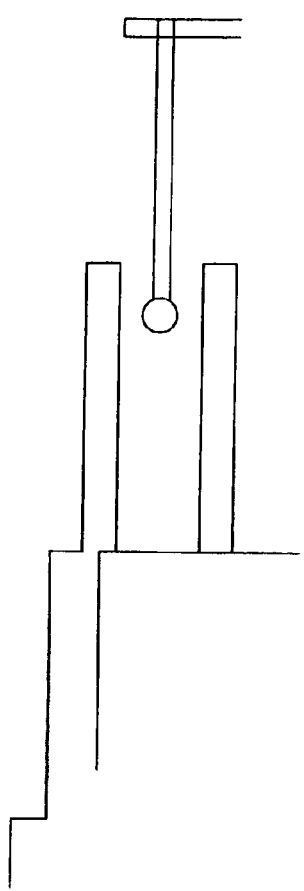
FIG. 15 is a schematic view of the electrodes of FIG. 1.
Figure 15B:
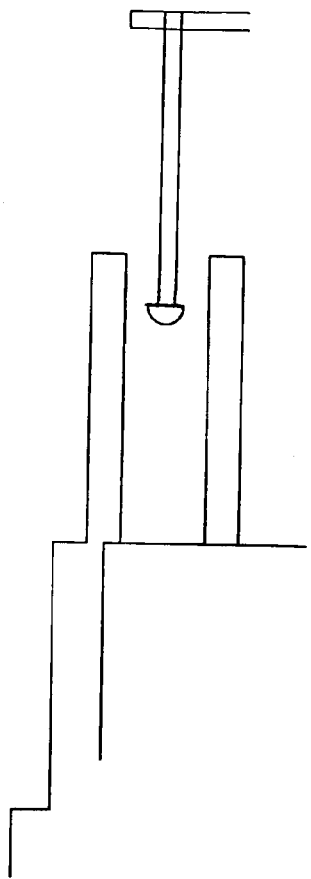
Figure 16:
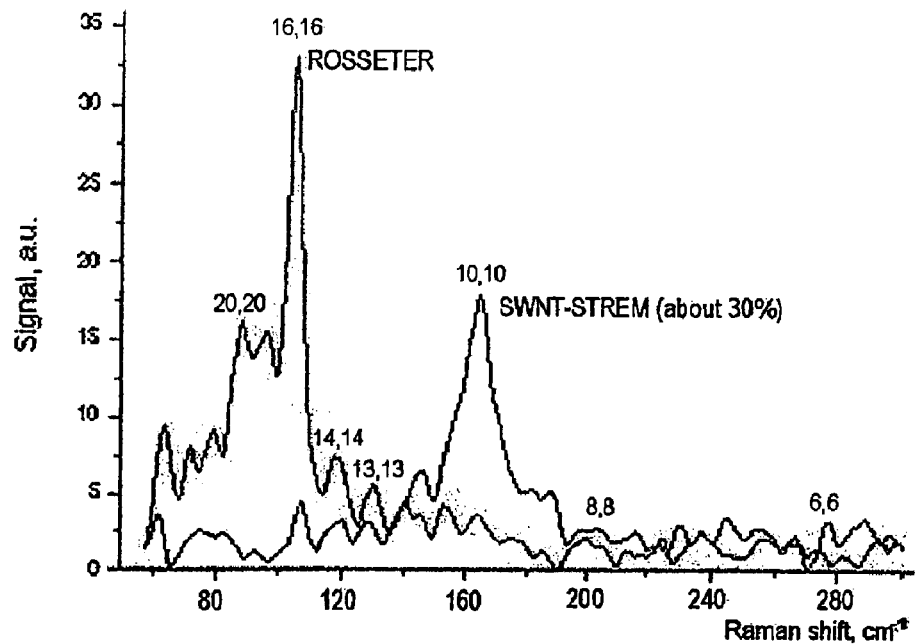
FIG. 16 shows a typical XRD profile and TEM image of deposits produced as coatings over W anodes at 30V in toluene.
Figure 17:
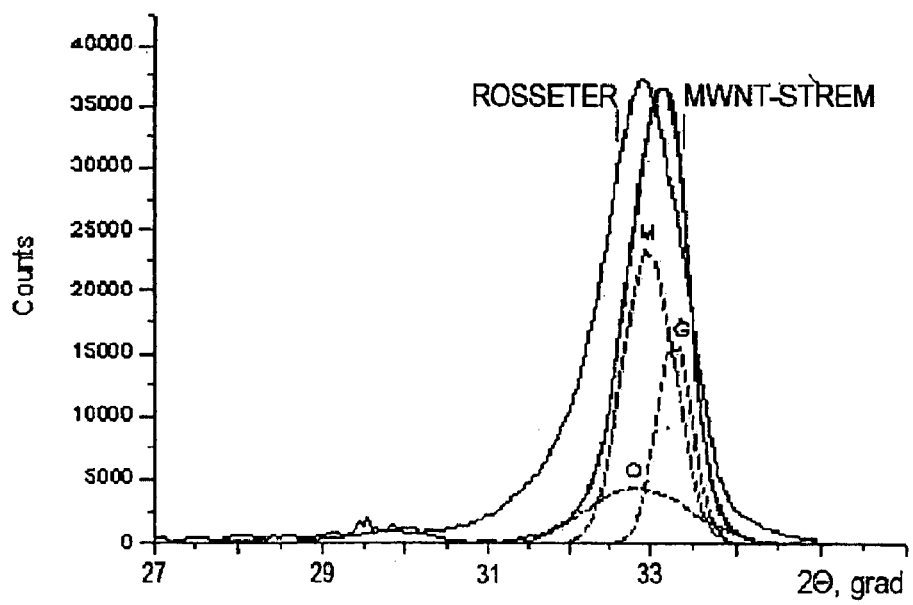
FIG. 17 shows typical micro-Raman spectra of SWNT samples as produced by Rosseter Holdings and STREM.
Figure 19:
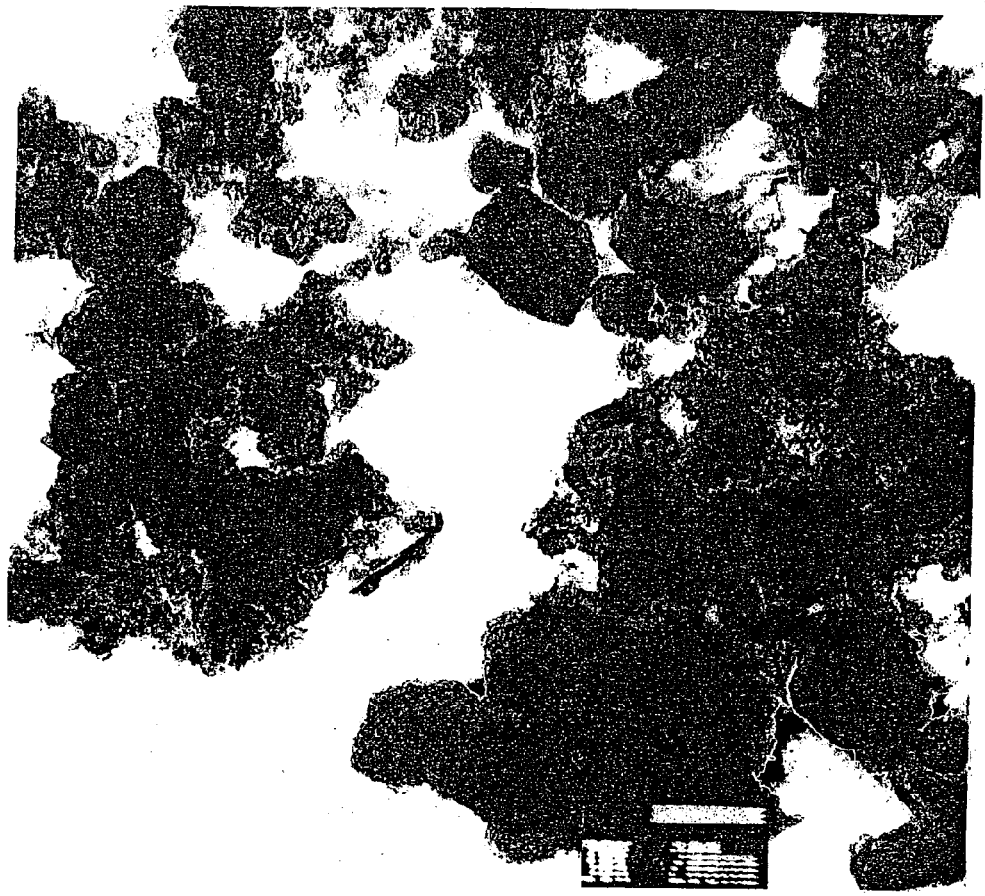
FIG. 19 shows a TEM image of deposits produced over a Mo anode at 60V.

FIG. 13 shows a design of the apparatus with 19 pairs of the electrodes/contactors vertically aligned in a compact hexagonal package. Graphite rods have a length within a range of 20 to 50 mm or longer and external/internal diameters of 4/1–2 mm provide electrode A3. The graphite contactor is made of a Russian commercial graphite, type MPG-6.

Example: Producing nanotube/nanoparticle deposits with a DC arc.

In use, the cylindrical stainless steel body 121 of the chamber 101 is fillede from the top by an aromatic liquid, like benzene, toluene, xylenes, etc. or their mixtures to a level that is, at least, enough to cover the spherical or hemisherical graphite contactors 6. Whatman filters 112 are installed at the top of the body to adsorb soot particles going from the liquid with bubbles of released gases.

Before the apparatus is switched on, air is pumped out from the body 101 through the automatic valve 113 and pure argon gas is pumped through the valve 109 to the pipes to fill the empty space to a pressure that is optimal for producing nanotubes. The pressure is controlled by a manometer 114. Top 115 and bottom 116 lids are made of teflon to provide insulation and the possibility of observing arcing during the process. Water cooling the body (and the liquid) is flowing through the inlet 17 to the outlet 118. Rubber rings 119 seal the body.

Buffer gas pressure in the pipe is controlled on a level that is enough to keep a gas bulb at the pipe tip, so that the gas flow through the arc will be initiated by a temperature gradient automatically as soon as the arc starts.

In a preferred embodiment, Mo or W anodes (with diameters of about 3–4 mm) are hung up inside the matrix's opening from the top lid of the body. Graphite (made as spheres and/or halves of spheres, and/or prisms with triangle or square cross sections, cylinders or truncated cylinders, flat plates, etc) or metallic (for instant, made in a rectangular shape of Ti-sponge or Al cylinders) contactors are attached to the free endings of the anodes closely to a surface of the matrix openings (cathode).

Such geometry provides two opportunities for producing nanotube deposits.

The first one is producing inside the openings when growth of the deposits causes over the anodes 103 from below to the top of the opening (see FIG. 13). The second opportunity is growing outside the openings over the anodes 103. In this case the deposit grow in two directions: in side-wards and upwards (see FIG. 13), thus, deposits are formed with bigger cross sections and lengths limited only by lengths of the anodes.

Both opportunities are realised when free anode 103 endings are placed inside the matrix's openings. If the endings are placed close to the top of the openings just a few of said inside deposit 125 will be produced (see FIG. 13). The inside 125 and outside 127 deposits can be easily separated from each other.

We found that the "inside" producing in benzene or toluene (as well as in any other suitable aromatic liquid) starts at a voltage of about 18 or 19 V. The best voltage for producing MWNT is within the range 24–36 V with deposit yields of 1.2–1.8 g/min, correspondingly (see FIG. 14).

One can see that increasing voltage higher than 36V reduces MWNT yields dramatically. We found just traces of MWNTs with voltage of 60V, whereas the most material in TEM pictures appeared as buckyonions, soot and graphite particles and, probably, SWNTs.

We used one anode to grow nanotube/nanoparticle deposit with the Apparatus of FIG. 13. Inside 125 and an outside 127 deposits were produced in toluene using one W anode (of 3 mm in diameter). A half of a graphite spherical contactor (diameter of about 12 mm) impregnated with Co and Ni oxides (by 3% wt. by the metals) was attached to a free ending of the rod and placed in a top of a graphite matrix's opening (cathode) to start arcing at an applied DC voltage of 30 Volts. At the beginning of the arcing an electric current was about 30 Amps (producing an "inside" deposit with a yield of about 1.5 g/min) then it was in the range from 20–30 Amps producing an "outside" deposit (with nearly the same yield of 1.5 g/min). Both deposits were easily detached from the electrodes and from each other. After the process the W rod was slightly eroded at the free end. The inside 25 and outside 27 deposits (as produced) contains MWNTs=48 and 38%, Onions=10 and 8%, SWNTs=39 and 41%, Amorphous=5 and 11% and Metals by 1%, correspondingly. FIG. 3 shows XRD profiles of said "inside" deposit and MWNT-deposit as produced by STREM (shells). One can see that our sample mainly contains MWNTs (about 50%) and byckyonions, whereas STREM-MWNT contains MWNTs, buckyonions and graphite ($2\Theta=33.5°$).

We developed the deposits treating them with cold mixture of nitric and fluoric acids for about 16 hours (to remove metals without any oxidation of nanotubes), cleaning with distilled water, drying and oxidizing in air at 535° C. for 1 hour. After the treatment the deposits were reduced to 87 and 84% of their initial weights. Their compositions revealed from XRD and Raman data were as following: MWNTs=51 and 47%, Onions by 4%, SWNTs=45 and 49%, Amorphous<1%, Metals (mainly, Mo)<0.5%, correspondingly for the treated inside 25 and outside 27 deposits.

An outside deposit 127 of 30 grams per 12 min (with a yield of 2.5 g/min) was produced with Mo anode (2 rods with diameters of 2.5 mm and lengths of about 10 cm) submerged in a mixture of toluene with Co- and Ni-naphtenates (on a basis of toluene). Co and Ni elemental concentration in said mixture was by about 3% wt. A half of a graphite spherical contactor (diameter of about 12 mm)

impregnated with Co and Ni oxides (by 3% wt. by the metals) was attached to free endings of the rods and placed in a top of a graphite matrix's opening (cathode) to start arcing at an applied DC voltage of 36 Volts. At the beginning of the arcing an electric current was in the range 20–30 Amps (producing a small "inside" deposit) then it was varied in the range from 6 to 60 Amps (mean current about of 25 Amps) producing a huge outside deposit 127. Both Mo rods were completely eroded and/or melted during the arcing between the rods and the deposit.

XRD and micro-Raman spectrometry show a composition of the deposit (as produced) as following: MWNTs=29%, Onions=7%, SWNTs=43%, Amorphous=10%, Metals=10% (mainly, Mo, Fe, Co and Ni).

FIG. 4 shows Raman spectra of the deposit and of SWNT (STREM) sample, both as produced.

One can see that all features, Raman peaks corresponding to certain arm-chair SWNTs, are the same in both spectra but our deposit contains SWNTs of bigger diameters, mainly of 2.2 and 2.7 nm that corresponds to armchair SWNTs (16,16) and (20,20), correspondingly, whereas STREM-SWNT mostly consists of (11,11), (10,10) and (9,9) armchair SWNTs with few of (16,16) and (20,20) and higher.

We developed the deposit, treating it at room temperature with mixtures of nitric and fluoric acids for 16–21 hours (to remove metals without any oxidation of nanotubes), then cleaning with distilled water, drying and oxidising in air at 535° C. for 1 hour. After the treatment the deposit was reduced to 25 grams (83% of initial weight) and its composition revealed from XRD and Raman data was as following: MWNTs=35%, Onions=3%, SWNTs=59%, Amorphous<1%, Metals (mainly, Mo)=2%.

This shows that producing carbon nanotubes with a total content of 94% (or even higher) and a yield of 2 g/min is possible by using our process and apparatus.

TEM pictures (see FIGS. 18a–c) of the deposit confirm these findings. FIG. 18a reveals no soot particles and few onion-like particles after the treatment, whereas MWNTs and lumps/bundles of SWNTs cover all the picture's area. More detail look for the SWNTs' lumps/bundles reveals SWNTs' lengths and diameters within the range 0.2–1 $\mu$m and 1.5–3 nm, correspondingly.

A High-Resolution TEM picture (FIG. 18b) shows that both, spherical and conical, ends of MWNTs (including Triple Wall Nano Tubes) are stayed intact after such oxidative treatment, whereas further oxidising in air at temperatures up to 600° C. for 1–1.5 hours allows opening all spherical ends of MWNTs independently from number of the MWNTs' layers and leaving the conical ends to be intact (see FIG. 18c). Thus, following the comprised steps we are able to purify our carbonaceous deposits to mixture of MWNTs and SWNTs, and to open the nanotubes' spherical ends, that means that SWNTs might be opened from both ends.

We also found that producing deposits over graphite contactors, containing mainly buckyonions and SWNTs, was possible with the apparatus of the present invention at applied voltages of 60V or a bit higher. The yield was high (>15 mg/sec) but it was difficult to maintain the process continuously because of very quick erosion (few seconds) of the contactor. Nevertheless, we believe that a successful positioning of the electrodes for such a production is possible. FIG. 8 shows a typical TEM image of deposits produced over Mo anodes at 60V in toluene.

Our invention allows a continuous producing of nanotube deposits with record yields of 1–3 g/min per a pair of the electrodes with a very low specific consumption of electric energy of 5–10 kW*hour per 1 kg of the deposit produced. Using processors with several electrodes pair and elongated anodes allows to produce nanotubes and nanoparticles in bulk.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

Improvements and modifications may be incorporated herein without deviating from the scope of the invention.

What is claimed is:

1. A process for producing nanotubes, the process comprising:
   a) providing a hydrocarbon liquid in a body comprising an anode electrode and a cathode electrode wherein one of the electrodes is free-movable relative to the other electrode and applying a DC voltage to the electrodes;
   b) applying an over pressure above the hydrocarbon liquid and applying a buffer gas at or near a gap between said electrodes; and
   c) causing the two electrodes to barely touch each other, thus starting an electric arc between the two electrodes; such that said electric arc cracks the hydrocarbon liquid to produce gaseous and plasma species of carbon and hydrogen as cracking products, causing the electrodes to separate to a self-adjusting gap thereby increasing nanotube production.

2. The process as claimed in claim 1, wherein the hydrocarbon liquid contains pure aromatics.

3. The process as claimed in claim 2, wherein the hydrocarbon liquid contains Co-naphthenates an Ni-naphthenates in toluene solutions or in toluene solutions containing sulphur.

4. The process as claimed in claim 1, wherein the electric arc is produced by an auto-regulated low-voltage contact electric arc discharge.

5. The process as claimed in claim 1, wherein a voltage in the range 18V–65V is used to produce the electric arc.

6. The process as claimed in claim 1, wherein a voltage in the range 20V–60V is used to produce the electric arc.

7. The process as claimed in claim 1, wherein a voltage in the range 24V–36V is used to produce the electric arc.

8. The process as claimed in claim 1, wherein, the buffer gas is composed of gases released during the cracking of said hydrocarbon liquid.

9. The process as claimed in claim 1, wherein the over pressure is between 0.8 atm and 1.0 atm.

10. The process as claimed in claim 1, wherein the hydrocarbon liquid contains any one of the group consisting of benzene, cyclohexane and hexane.

11. The process as claimed in claim 1, wherein an additional buffer gas may be used to alter the composition of the buffer gas to control the composition of carbon allotrope products.

12. The process as claimed in claim 11, wherein the additional buffer gas is an inert gas.

13. The process as claimed in claim 11, wherein the inert gas is Argon.

14. The process as claimed in claim 11, wherein the additional buffer gas is an oxidant.

15. The process as claimed in claim 14, wherein the oxidant is oxygen or air.

16. The process according to claim 1, further comprising the steps of:
   a) immersing the anode and cathode in the hydrocarbon liquid, said anode being in the form of cylindrical pipes or rods and the cathode being in the form of a graphite matrix wherein the anode is installed axially in vertical cylindrical openings of the graphite matrix forming the cathode, said anode and cathode being connected to a DC power supply switchable on and off by spherical graphite contactors placed on the pipes or rods of the anode, said contactors being able to move around their own geometrical center and retrogressively along vertical cylindrical openings of the graphite matrix forming the cathode, said anode and the contactors being made of pure graphite or graphite impregnated with Co-oxides and Ni-oxides;
   b) providing a pulsed self-regulated action of an electric current arc discharge between the anodes and cathodes;
   c) producing an arc having a maximum current intensity of 100–400 A/cm$^2$ and a voltage of 18V–65V; and
   d) pumping a buffer gas through the pipes forming said anode or through the vertical openings of the graphite matrix forming said cathode before and during the arc discharge process to control output and quality of the nanotubes.

17. The process as claimed in claim 1, wherein the body comprises a chamber containing the hydrocarbon liquid, wherein the anode is formed from graphite or graphite impregnated with Co-oxides and Ni-oxides or metal and the cathode is formed from graphite, and where the anode is formed from metal a contactor is fixedly attached to the anode said contactor being arranged in proximity to the cathode, and where said anode is formed from graphite or graphite impregnated with Co-oxides an Ni-oxides said anode is arranged in proximity to said cathode, the process comprising the step of applying a DC voltage across said anode or contactor and said cathode.

18. The process as claimed in claim 17, wherein the voltage is in the range 18V–65V.

19. The process as claimed in claim 17, wherein the contactor is made from graphite or graphite impregnated with Co-oxides and Ni-oxide.

20. The process as claimed in claim 17, wherein the contactor is made from Ti-sponge or aluminum.

21. The process as claimed in claim 17, wherein the contactor is spherical or hemi-spherical in shape.

22. The process as claimed in claim 17, wherein the anode is constructed from Tungsten.

23. The process as claimed in claim 17, wherein the anode is constructed from Molybdenum.

24. The process as claimed in claim 17, wherein the cathode consists of a matrix having a plurality of cavities capable of receiving the anode.

25. The process as claimed in claim 17, comprising the step of circulating coolant through a cavity in the wall of the chamber.

26. The process as claimed in claim 17, comprising the step of maintaining the pressure inside the chamber at a desired level through the use of a pressure regulation means.

27. The process as claimed in claim 26, wherein the desired over pressure level is 0.8 atm to 1.0 atm.

28. The process as claimed in claim 17, wherein the contactor is a cylindrical or rectangular rod in shape.

* * * * *

UNITED STATES PATENT AND TRADEMARK OFFICE
CERTIFICATE OF CORRECTION

PATENT NO. : 6,884,405 B2
DATED : April 26, 2005
INVENTOR(S) : Ryzhkov

It is certified that error appears in the above-identified patent and that said Letters Patent is hereby corrected as shown below:

Title page,
Item [30], Foreign Application Priority Data, insert -- PCT/IB99/00481, PCT Filed: March 23, 1999 --.
Item [56], References Cited, U.S. PATENT DOCUMENTS, insert
-- 5,424,054    6/1995         Bethune, et al. --.

Column 2,
Line 33, delete "fullerines" and replace with -- fullerenes --.

Column 5,
Line 65, delete "fillerenes" and replace with -- fullerenes --.

Column 8,
Line 64, delete "hyrocarbon" and replace with -- hydrocarbon --.

Column 20,
Line 21, after "*methylclopentane 2.5-5%*" insert -- , cyclohexane 2.5-7%, naphtenese ($C_7H_{14}$) 7-15%, naphtene $C_9H_{18}$ 5-14%, benzene --.

Column 22,
Line 35, delete "extemal/intemal" and replace with -- external/internal --.

Column 23,
Line 24, after "*111*" insert -- and are connected --.
Line 38, delete "fillede" and replace with -- filled --.

UNITED STATES PATENT AND TRADEMARK OFFICE
CERTIFICATE OF CORRECTION

PATENT NO. : 6,884,405 B2
DATED : April 26, 2005
INVENTOR(S) : Ryzhkov

It is certified that error appears in the above-identified patent and that said Letters Patent is hereby corrected as shown below:

Column 25,
Line 63, delete "posssible" and replace with -- possible --.

Column 26,
Line 38, delete "an" and replace with -- and --.

Column 28,
Line 3, delete "an" and replace with -- and --.
Line 11, delete "Ni-oxide" and replace with -- Ni-oxides --.

Signed and Sealed this

Eighth Day of November, 2005

JON W. DUDAS
*Director of the United States Patent and Trademark Office*